United States Patent
Schmidt et al.

(10) Patent No.: US 12,459,349 B2
(45) Date of Patent: Nov. 4, 2025

(54) POWER SYSTEM ASSEMBLY FOR A POWER MACHINE

(71) Applicant: Doosan Bobcat North America, Inc., West Fargo, ND (US)

(72) Inventors: Michael Schmidt, Bismarck, ND (US); Brent Durkin, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 0 days.

(21) Appl. No.: 18/745,438

(22) Filed: Jun. 17, 2024

(65) Prior Publication Data

US 2024/0424886 A1   Dec. 26, 2024

Related U.S. Application Data

(60) Provisional application No. 63/509,544, filed on Jun. 22, 2023.

(51) Int. Cl.
 *B60K 7/00* (2006.01)

(52) U.S. Cl.
 CPC ......... *B60K 7/0007* (2013.01); *B60Y 2300/60* (2013.01)

(58) Field of Classification Search
 CPC ........................... B60Y 7/0007; B60Y 2300/60
 USPC ...................................................... 180/65.6
 See application file for complete search history.

(56) References Cited

U.S. PATENT DOCUMENTS

| | | | |
|---|---|---|---|
| 3,895,728 A | 7/1975 | Heggen | |
| 4,060,261 A | 11/1977 | Bauer et al. | |
| 4,252,203 A | 2/1981 | Oswald et al. | |
| 4,278,140 A | 7/1981 | Oswald et al. | |
| 4,359,116 A | 11/1982 | Mankey | |
| 4,407,381 A | 10/1983 | Oswald et al. | |
| 4,705,449 A | 11/1987 | Christianson et al. | |
| 4,962,821 A | 10/1990 | Kim | |
| 6,488,110 B2 | 12/2002 | Price | |
| 6,648,785 B2 * | 11/2003 | Porter | B60K 6/26 903/910 |
| 6,719,656 B2 * | 4/2004 | Bowen | B60K 6/365 903/952 |
| 6,786,289 B2 | 9/2004 | Bateman et al. | |

(Continued)

FOREIGN PATENT DOCUMENTS

| | | |
|---|---|---|
| CN | 108 385 765 A | 8/2018 |
| EP | 2 983 970 B1 | 8/2018 |
| KR | 10-1649538 B1 | 8/2016 |

*Primary Examiner* — Hau V Phan
(74) *Attorney, Agent, or Firm* — Quarles & Brady LLP

(57) ABSTRACT

A drivetrain assembly of a power machine can include a motor sub-assembly. The motor sub-assembly can include a bearing carrier, a reduction assembly, and an electric motor. The bearing carrier can be configured to be fixedly attached at an outboard side to a first lateral side of a frame of the power machine to operably transmit rotational power to at least one tractive element of the power machine. An outboard side of the reduction assembly can be fixedly attached to an inboard side of the bearing carrier. An inboard side of the electric motor can be fixedly attached to the outboard side of the reduction assembly and the electric motor can be configured to operably transmit the rotational power to the bearing carrier via the reduction assembly. At least part of the electric motor can laterally overlap with the bearing carrier.

16 Claims, 19 Drawing Sheets

(56) References Cited

U.S. PATENT DOCUMENTS

| | | | |
|---|---|---|---|
| 8,016,065 B2 | 9/2011 | Osborn et al. | |
| 8,727,923 B2 * | 5/2014 | Huelsemann | B60K 7/0007 |
| | | | 475/5 |
| 8,761,984 B2 * | 6/2014 | Yates | B60L 7/18 |
| | | | 180/65.6 |
| 9,650,088 B2 | 5/2017 | Haar et al. | |
| 10,065,500 B2 | 9/2018 | Higuchi | |
| 10,442,462 B2 | 10/2019 | Higuchi et al. | |
| 10,889,184 B2 | 1/2021 | Petrenec et al. | |
| 11,498,409 B1 * | 11/2022 | Smith | B60K 6/28 |
| 11,505,061 B2 * | 11/2022 | Mepham | B60K 7/0007 |
| 11,712,957 B2 * | 8/2023 | Calandruccio | B60K 1/02 |
| | | | 180/65.6 |
| 2008/0230289 A1 | 9/2008 | Schoon et al. | |
| 2009/0032314 A1 | 2/2009 | Speichinger et al. | |
| 2010/0059305 A1 | 3/2010 | Osorn et al. | |
| 2017/0050517 A1 | 2/2017 | Higuchi | |
| 2019/0366829 A1 * | 12/2019 | Avenatti | B60S 11/00 |
| 2021/0001937 A1 * | 1/2021 | Beiler | B60G 11/225 |
| 2022/0161645 A1 * | 5/2022 | Trost | B60K 1/00 |

\* cited by examiner

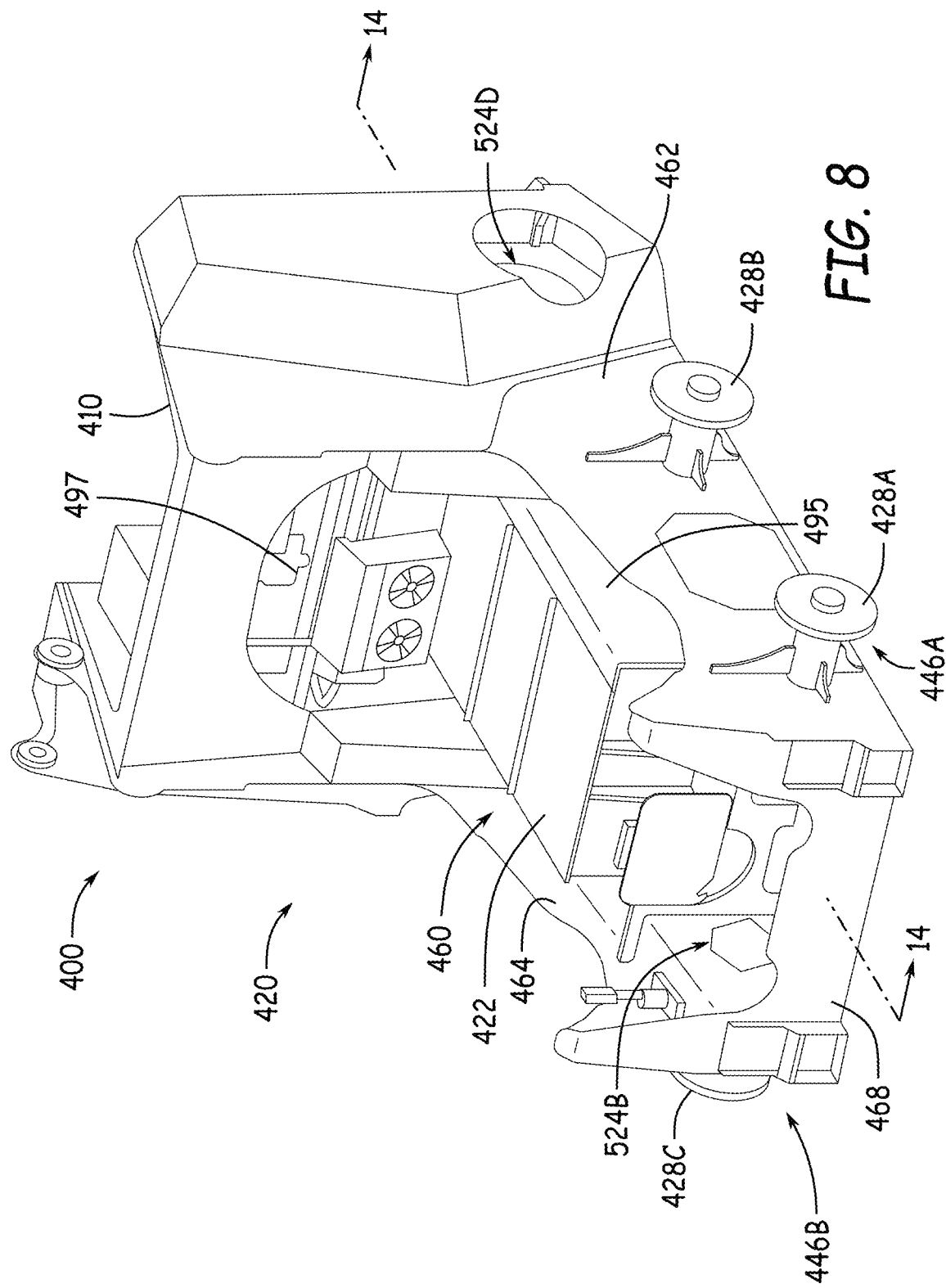

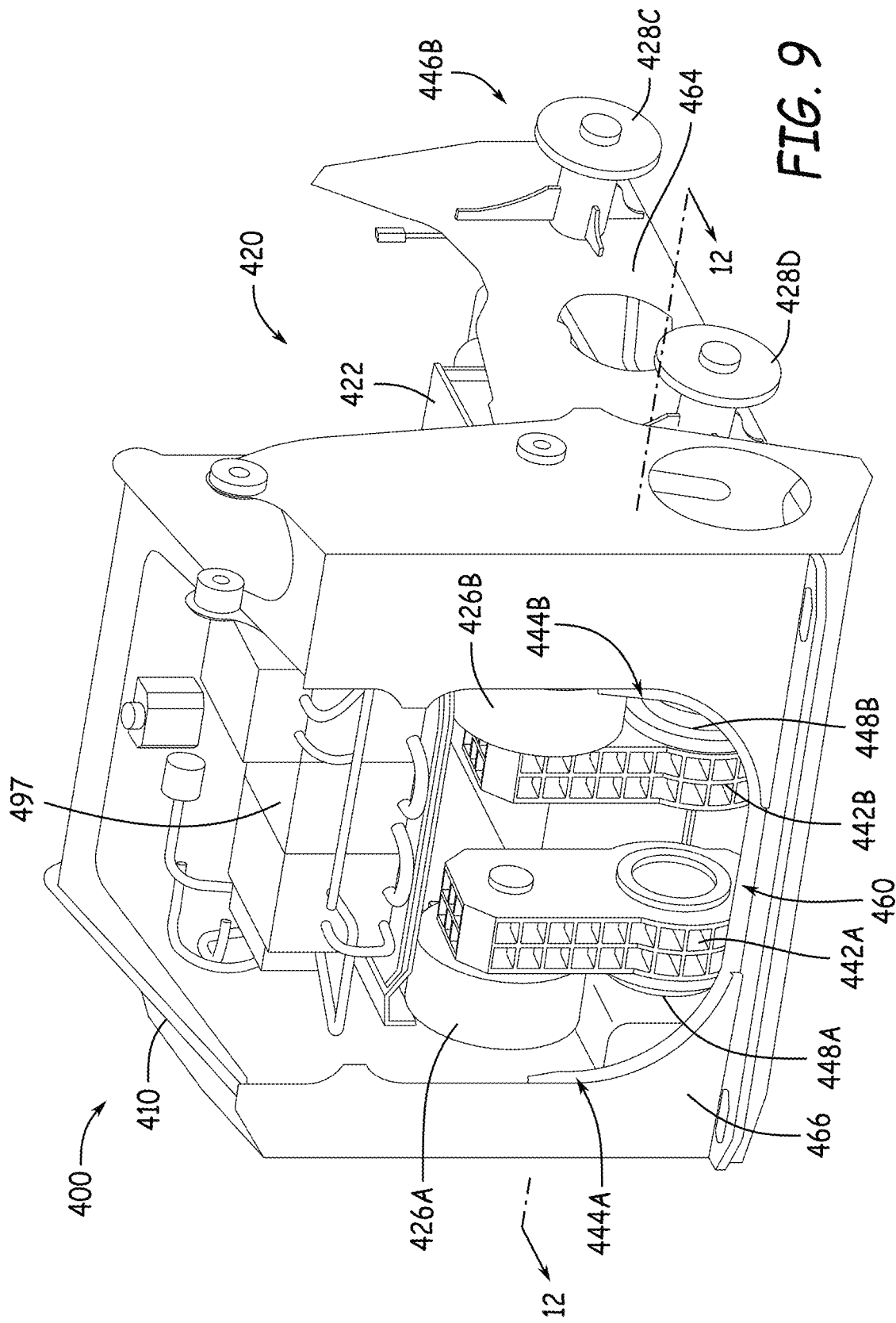

POWER SYSTEM ASSEMBLY FOR A POWER MACHINE

CROSS-REFERENCE TO RELATED APPLICATIONS

This application claims the benefit of U.S. Provisional Patent Application No. 63/509,544, filed Jun. 22, 2023, which is incorporated by reference herein in its entirety.

BACKGROUND

This disclosure is directed toward power machines. More particularly, the present disclosure is directed to tractive motor assemblies for power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

Different types of power machines, including skid-steer loaders, can include a power system powered by a power source to operate one or more components of the power machine. For example, some power machines include one or more motors that are arranged within a frame of the power machine and that are powered by a power source to operate two or more tractive elements of the power machine.

The discussion above is merely provided for general background information and is not intended to be used as an aid in determining the scope of the claimed subject matter.

SUMMARY

Examples according to this disclosure can provide a power system assembly, including motor sub-assemblies, for power machines. For example, some implementations disclosed herein can provide a power system assembly including an electrical power source and one or more electric motor assemblies that can be arranged within a frame of the power machine and powered by the electrical power source (e.g., to provide tractive power).

Some examples of the disclosure provide a drivetrain assembly of a power machine that can include a motor sub-assembly. The motor sub-assembly can include a bearing carrier, a reduction assembly, and an electric motor. The bearing carrier can be configured to be fixedly attached at an outboard side to a first lateral side of a frame of the power machine to operably transmit rotational power to at least one tractive element of the power machine. The reduction assembly can have an outboard side fixedly attached to an inboard side of the bearing carrier. The electric motor can have an inboard side fixedly attached to the outboard side of the reduction assembly and can be configured to operably transmit the rotational power to the bearing carrier via the reduction assembly. At least part of the electric motor can laterally overlap with the bearing carrier.

In some examples, the electric motor can be supported by the reduction assembly with a drive axis of the electric motor above a power transmission axis of the bearing carrier. In some such examples, the drive axis can be vertically aligned with the power transmission axis. In other such examples, the drive axis can be parallel with the power transmission axis.

In some examples, the reduction assembly can be a gear box that can provide a speed reduction for power transmission between the electric motor and the bearing carrier.

In some examples, the electric motor can be cantilevered from the reduction assembly and the reduction assembly can be cantilevered from the bearing carrier.

In some examples, the drivetrain assembly can further include a chain drive assembly that can include a first drive chain that can extend from the bearing carrier to a rear axle assembly to provide tractive power from the bearing carrier to the rear axle assembly and a second drive chain that can extend from the rear axle assembly to a front axle assembly to provide tractive power to the front axle assembly via the rear axle assembly. In some such examples, a locking brake can be arranged to engage the front axle assembly. In other such examples, a drive axis of the electric motor can be disposed above the first and second drive chains.

In some examples, the drivetrain assembly can further include a chain drive assembly that can include a chain case for a front axle assembly and a rear axle assembly, and the bearing carrier can be mounted to an inboard side of the chain case and the electric motor can extend above and laterally overlap with the chain case.

In some examples, the drivetrain assembly can further include a chain drive assembly that can include a chain case for a front axle assembly and a rear axle assembly, and the bearing carrier can include an outboard mounting face that can be secured to the chain case and at least one main bearing of the bearing carrier can be disposed outboard of the outboard mounting face, within the chain case.

Some examples of the disclosure provide a power machine that can include a frame, a power source supported by the frame, and a first drivetrain assembly. The first drivetrain assembly can include a first chain drive assembly, and a first motor sub-assembly. The first chain drive assembly can include a first chain case that can be arranged on a first lateral side of the frame, a front axle assembly that can include a front axle, a rear axle assembly that can include a rear axle, and a first chain assembly that can be arranged to power the front and rear axle assemblies. The first motor sub-assembly can be supported on the first chain case that can be arranged along the first lateral side of the frame to power the front and rear axles, and the first motor sub-assembly can define a power transmission axis to provide power to the first chain drive assembly that can be rearward of the rear axle.

In some examples, the first motor sub-assembly can include a first bearing carrier, a first reduction assembly, and a first electric motor. The first bearing carrier can be fixedly attached to and operably supported by the first chain case to define the power transmission axis. The first reduction assembly can be operably supported by the first bearing carrier relative to the first chain case, with the first reduction assembly extending inboard of the first bearing carrier and operably engaged with the first bearing carrier to provide power along the power transmission axis. The first electric motor can be operably supported by the first reduction assembly relative to the first bearing carrier, and thereby relative to the first chain case, with the first electric motor extending outboard of the first reduction assembly. In some such examples, the first electric motor can extend above the first bearing carrier and can laterally overlap with the first chain case.

In some examples, the first motor sub-assembly can include a drive sprocket that can be arranged to rotate about the power transmission axis to transmit rotational power. The rear axle assembly can include a first axle sprocket and a second axle sprocket, and the first axle sprocket can be connected to the drive sprocket by a first chain of the first chain assembly. The front axle assembly can include a third axle sprocket that can be connected to the second axle sprocket by a second chain of the first chain assembly to be powered via the rear axle assembly. In some such examples, the front axle assembly can further include a brake disc that can be arranged to be engaged by a locking brake.

Some examples of the disclosure provide a method of assembling a power machine. The method can include securing a first motor sub-assembly on a first lateral side of the power machine, to power a front axle assembly and a rear axle assembly on the first lateral side of the power machine, and can include securing a first bearing carrier to a first frame sidewall on the first lateral side of the power machine. The first gearbox can be cantilevered from the first bearing carrier, relative to the first frame sidewall, to extend inboard of the first bearing carrier and the first frame sidewall. A first electric motor can be cantilevered from the first gearbox to extend outboard of the first gearbox and above the first bearing carrier.

In some examples, the first frame sidewall can be an inboard wall of a first chain case of a chain drive assembly for the front and rear axle assemblies, and the first electric motor can extend above and laterally overlaps with the first chain case.

In some examples, the first frame sidewall can be an inboard wall of a first chain case of a chain drive assembly for the front and rear axle assemblies, and securing the first bearing carrier to the first frame sidewall can include extending a first main bearing of the first bearing carrier to be fully within the first chain case.

In some examples, the first bearing carrier can be secured rearward of the rear axle assembly, and the method can further include securing a first drive chain between the first bearing carrier and the rear axle assembly to power the rear axle assembly and securing a second drive chain between the rear axle assembly and the front axle assembly to power the front axle assembly via the rear axle assembly.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

The following drawings are provided to help illustrate various features of non-limiting examples of the present disclosure and are not intended to limit the scope of the disclosure or exclude alternative implementations.

FIG. 8 is a front perspective view of power machine sub-assembly including a power source, a motor assembly, and a control system installed within a frame of a power machine in an example configuration of the power system of FIGS. 5-7.

FIG. 9 is a rear perspective view of the sub-assembly of FIG. 8.

Figure 13:
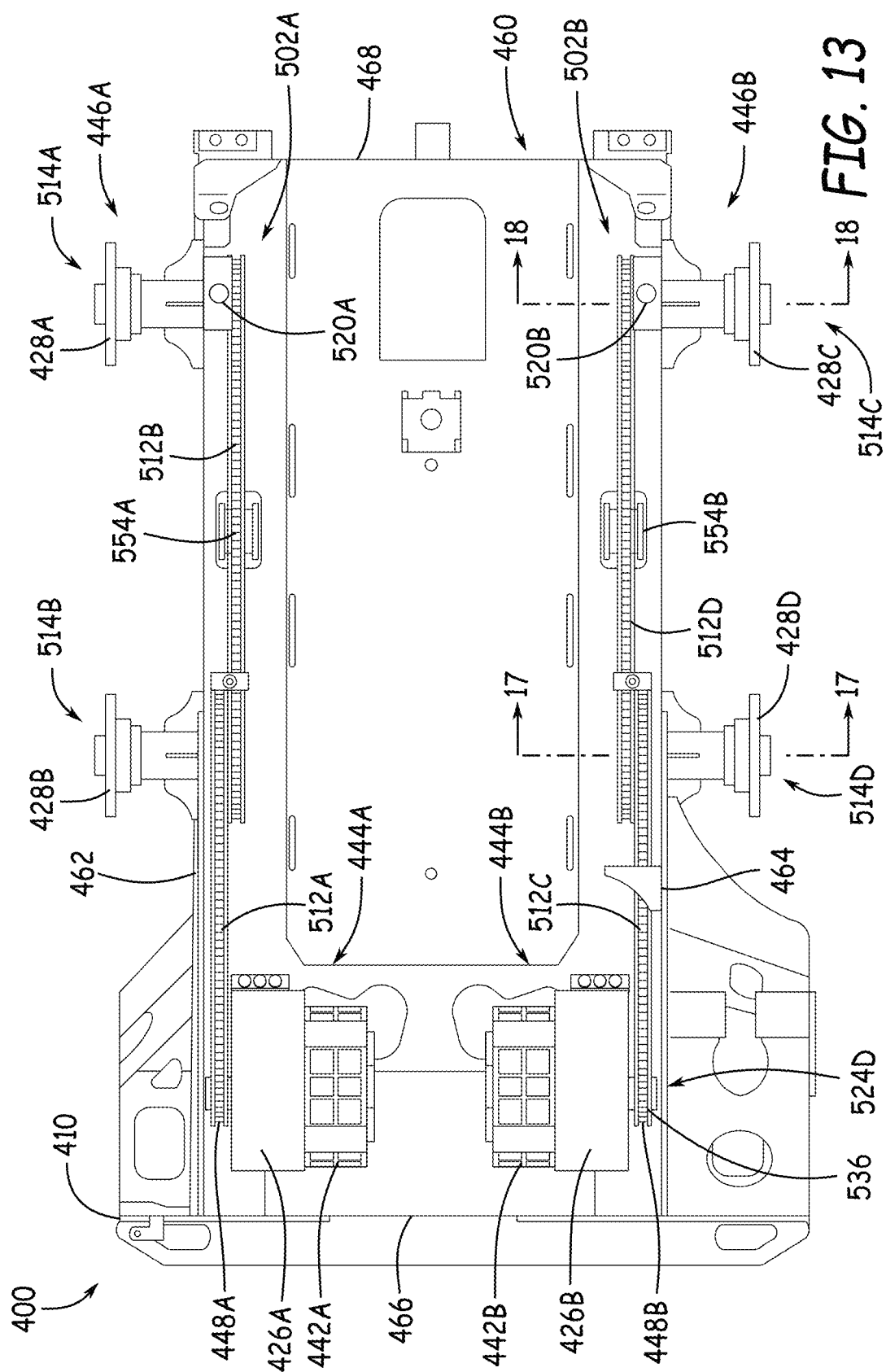
FIG. 13 is a top plan view of the sub-assembly of FIG. 8 with top sides of chain cases of the frame and other components removed to show internal components.
Figure 17:
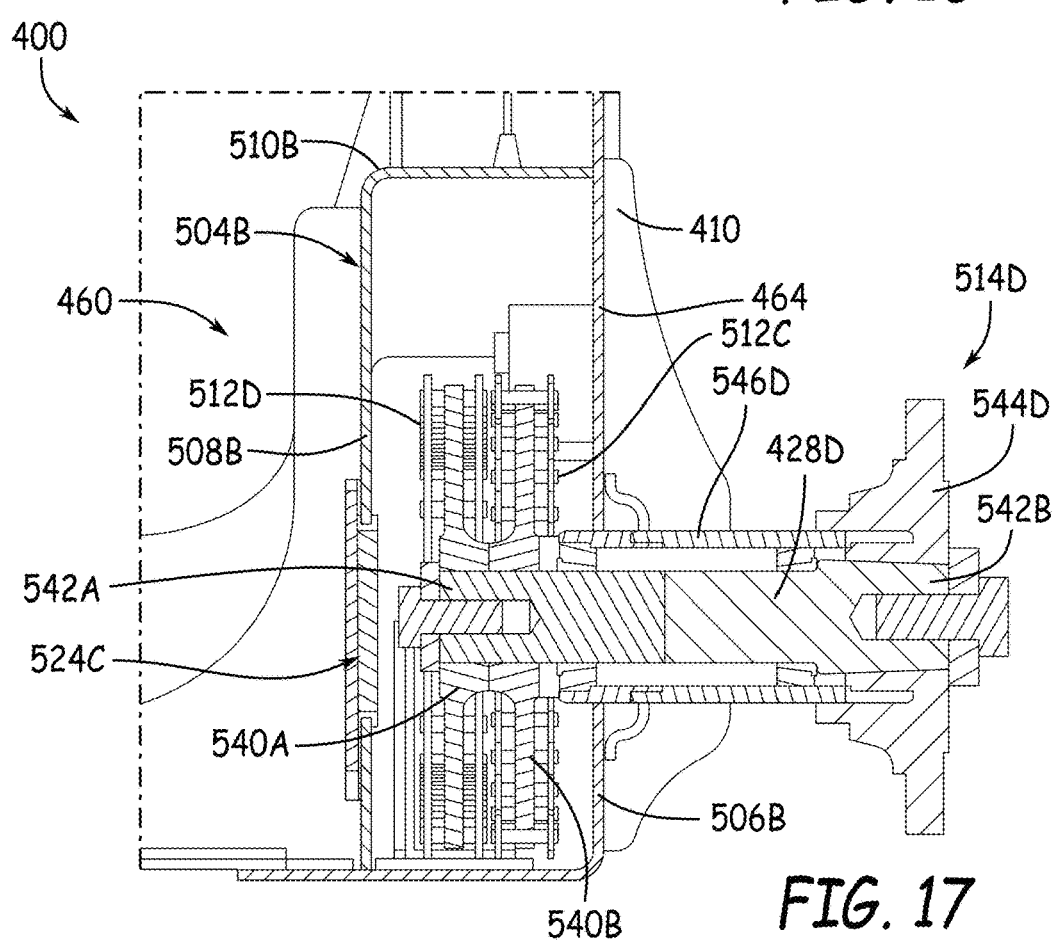
Figure 18:
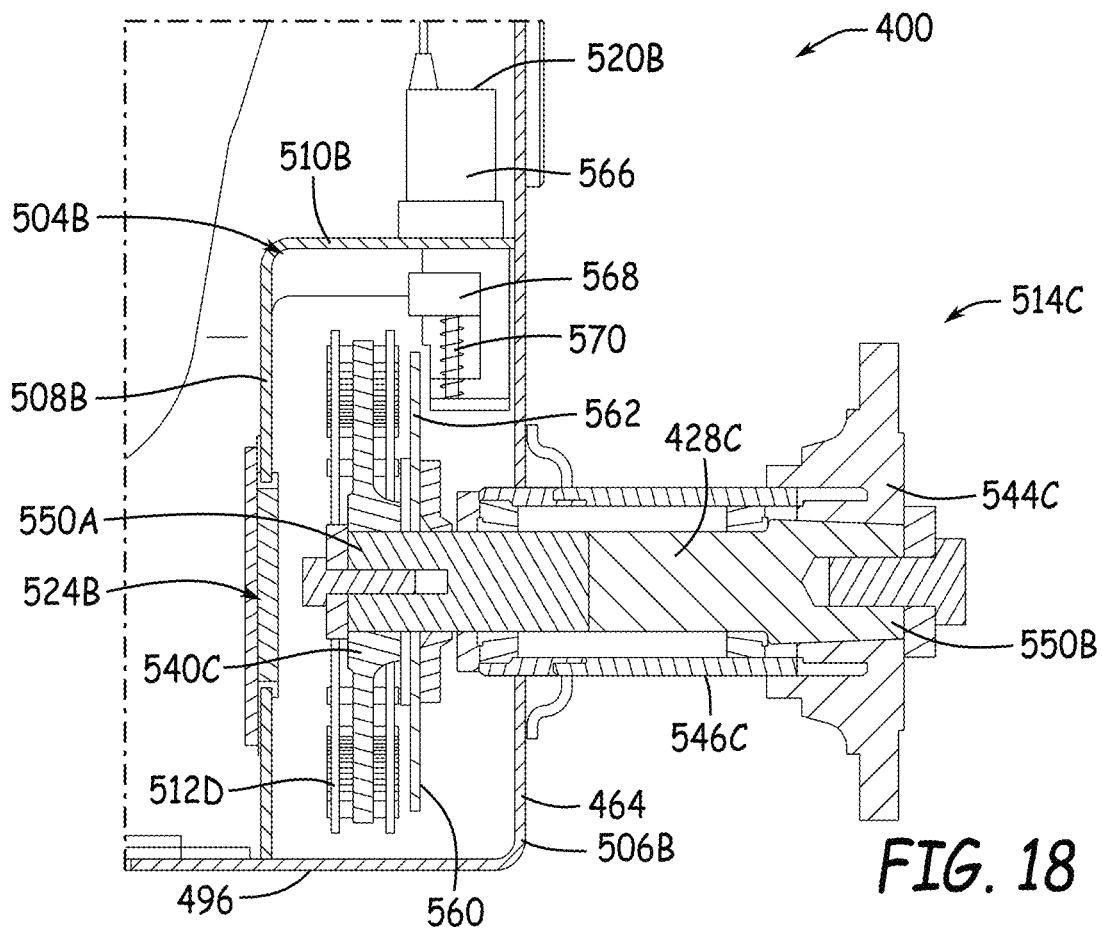

FIGS. 17 and 18 are cross-sectional views taken along lines 17-17 and 18-18, respectively, of FIG. 13.

Figure 15:
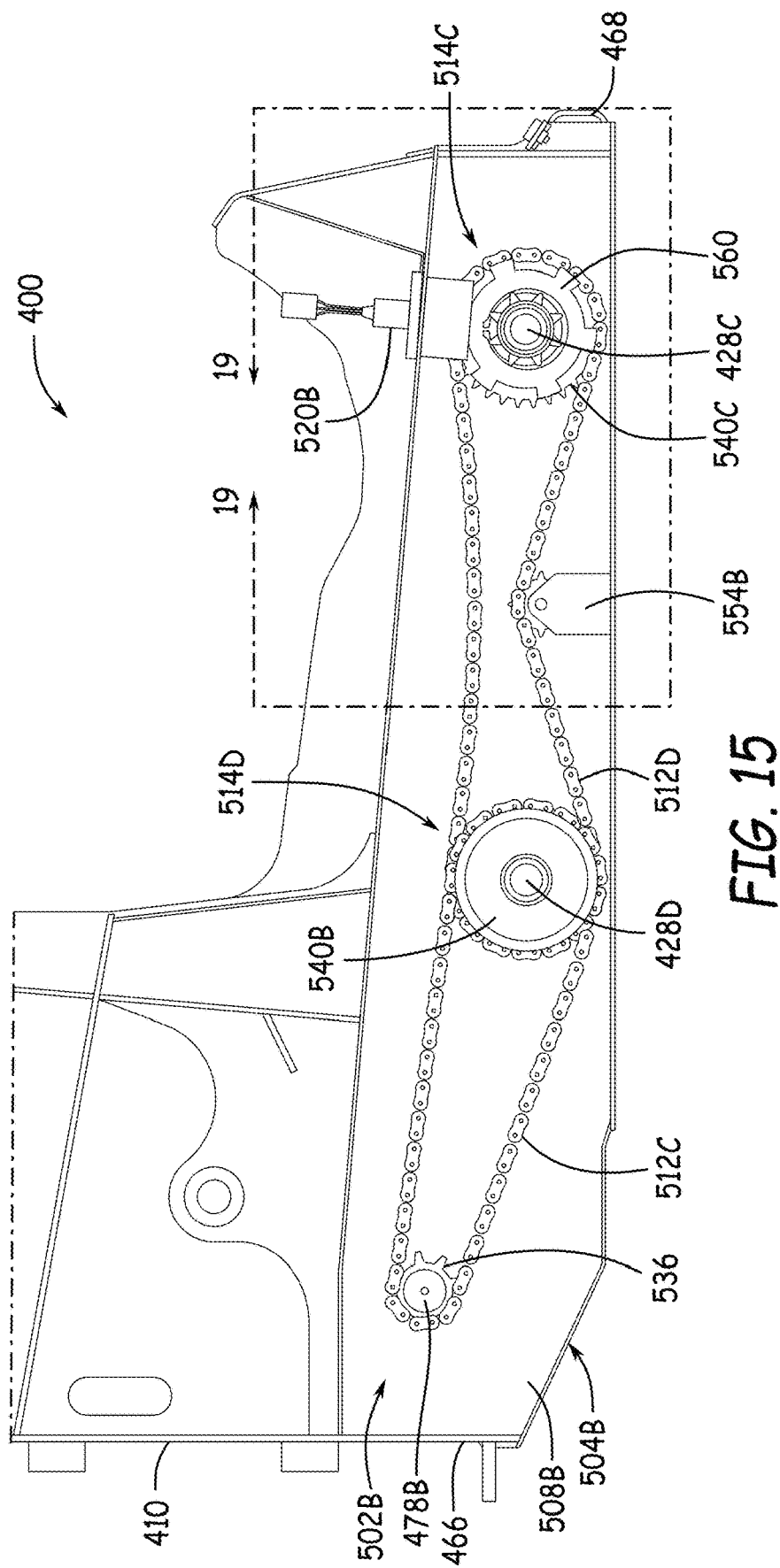
FIG. 15 is a side partial view of the sub-assembly of FIG. 8 with an outer sidewall of the frame and other components removed to show internal components.
Figure 19:
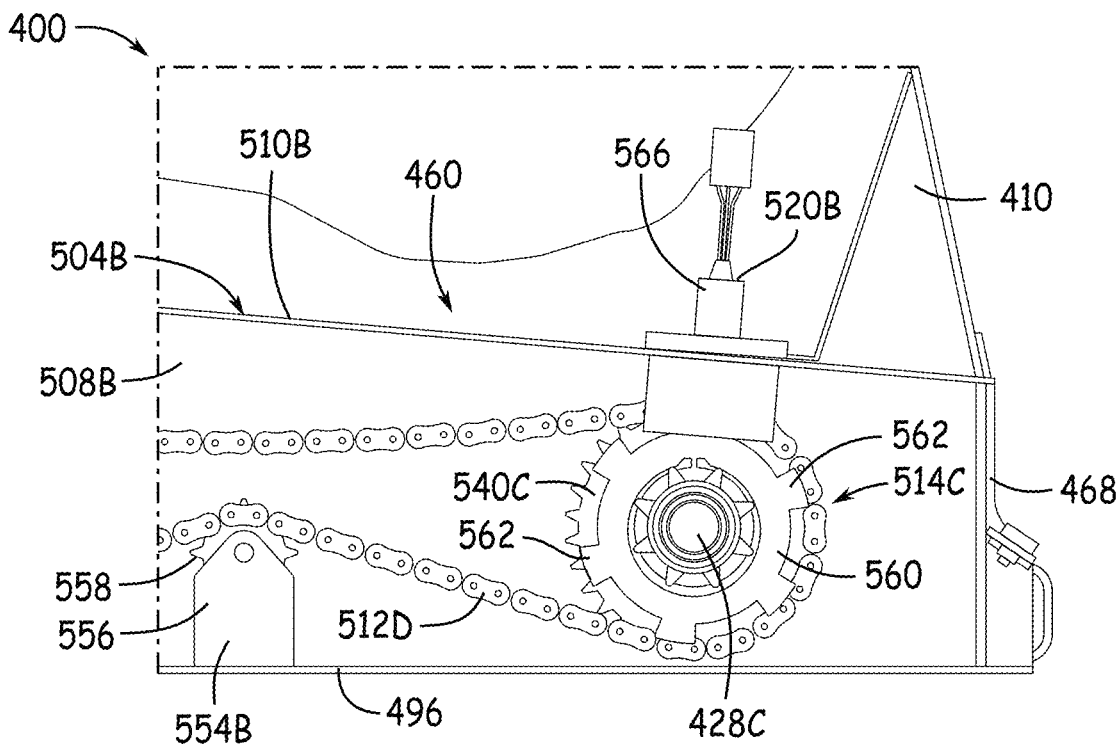

FIG. 19 is a detailed view of area 19-19 of FIG. 15.

Figure 20:
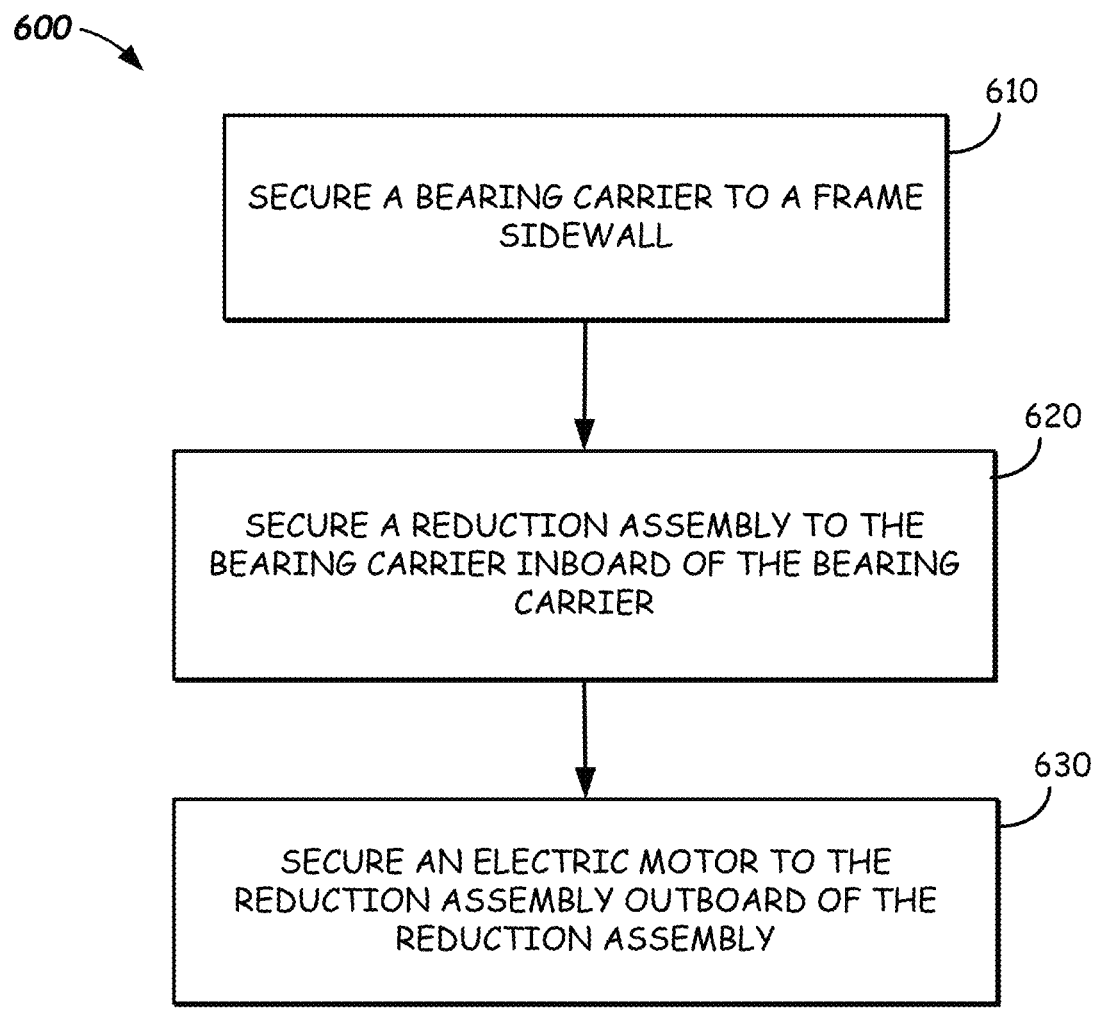

FIG. 20 is a schematic representations of a method of assembling a power machine according to examples of the present disclosure.

DETAILED DESCRIPTION

The concepts disclosed in this discussion are described and illustrated by referring to exemplary implementations of the disclosed technology. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Conventional power machines may be configured with a power system that includes a power source and one or more motor assemblies that are powered by the power source to operate tractive elements of the power machine. In particular, internal combustion engines are commonly utilized as the power source of power systems in conventional power machines. Such internal combustion engines are commonly arranged to leave ample space for the one or more motor assemblies to be arranged within the frame cavity, and to provide efficient power transmission over known transmission pathways. However, arrangements for power systems in conventional power machines may not be optimally suited for use with electrically powered power machines in general. In particular, conventional arrangements may not be readily adaptable for electrically powered machines that use a rechargeable battery system in place of an internal combustion engine. For example, these latter machines in particular may require significantly more or differently configured space for power sources within a frame cavity than conventional designs. Requirements concerning power transmission (e.g., for speed reduction) and other factors for electrically powered systems can also complicate power machine design relative to engine-driven power systems.

Examples of the present disclosure can address these problems, for example, by providing a power system with improved arrangements of motor assemblies. In particular, some example power systems can include powered drive actuators (e.g., electrical drive motors) that are located inboard of a frame or an axle assembly on an associated side of the power machine, and that are also located outboard of a reduction gearbox or other associated power-transmission assembly. In some such cases, the actuator can be supported relative to a power machine frame only (or primarily) by a gearbox or other speed reduction assembly, which may itself be supported relative to the power machine frame only (or primarily) by a bearing carrier. In addition to improved overall packaging, structural stability, and power transmission, some such arrangements can in particular provide improved availability of space for a rechargeable battery system and related components.

In some particular examples, a motor assembly can be mounted rearward of one or more axle assemblies on a frame. For example, an electric motor can be cantilevered or otherwise supported at a rear portion of a chain case, with a corresponding drive shaft extending into the chain case to thereby power rotation at multiple axle assemblies of the chain case. In some such cases, in particular, other beneficial arrangements can also be employed (e.g., with a motor axis located above a bearing carrier axis, with the motor above the chain case, with a wedge or other stop brake arranged at a front axle assembly, or with a double chain sprocket at a rear axle assembly).

Further, examples of the present disclosure can provide motor assemblies, and particularly drive motor assemblies, that are more easily installed, removed, or otherwise serviced, as compared to conventional motor assemblies. For example, some aspects of the present disclosure can provide first and second motor sub-assemblies that are arranged within the frame cavity with a gap therebetween so that the first motor sub-assembly can be serviced (e.g., installed or disassembled) without requiring removal of the second motor sub-assembly.

In some arrangements, cantilevered support of drive motors or power reduction assemblies can in particular provide improved structural and operational characteristics for delivery of drive power. For example, some arrangements can include a drive motor that is cantilevered to extend outboard of a gearbox or other speed reduction assembly (e.g., with the gearbox inboard of an associated bearing carrier or chain drive). As another example, some arrangements can include an electric drive motor that is cantilevered from a reduction gear box or otherwise supported by the frame via the gear box or other assembly (e.g., with the gearbox cantilevered from a bearing carrier or axle assembly to support the drive motor).

In some arrangements, particular alignment of axes for power transmission (e.g., front-to-rear or horizontal alignment) can provide particular benefits for packaging or power transmission efficiency. For example, some motor sub-assemblies can include a power transmission axis between a drive motor and a gearbox that is offset from, but optimally aligned with, a power transmission axis between the gearbox and an axle assembly (e.g., via a single-axis bearing carrier). In particular, as also noted above, some sub-assemblies can include vertically aligned power transmission axes (e.g., in combination with one or more aspects the inboard/outboard arrangements discussed above), although other configurations are also possible. In some examples, power transmission axes for motor sub-assemblies can be arranged to be aligned with each other laterally across a power machine (e.g., with a power transmission axes for a right-side drive motor sub-assembly being coaxial with power transmission axes for a left-side drive motor sub-assembly).

Figure 2:
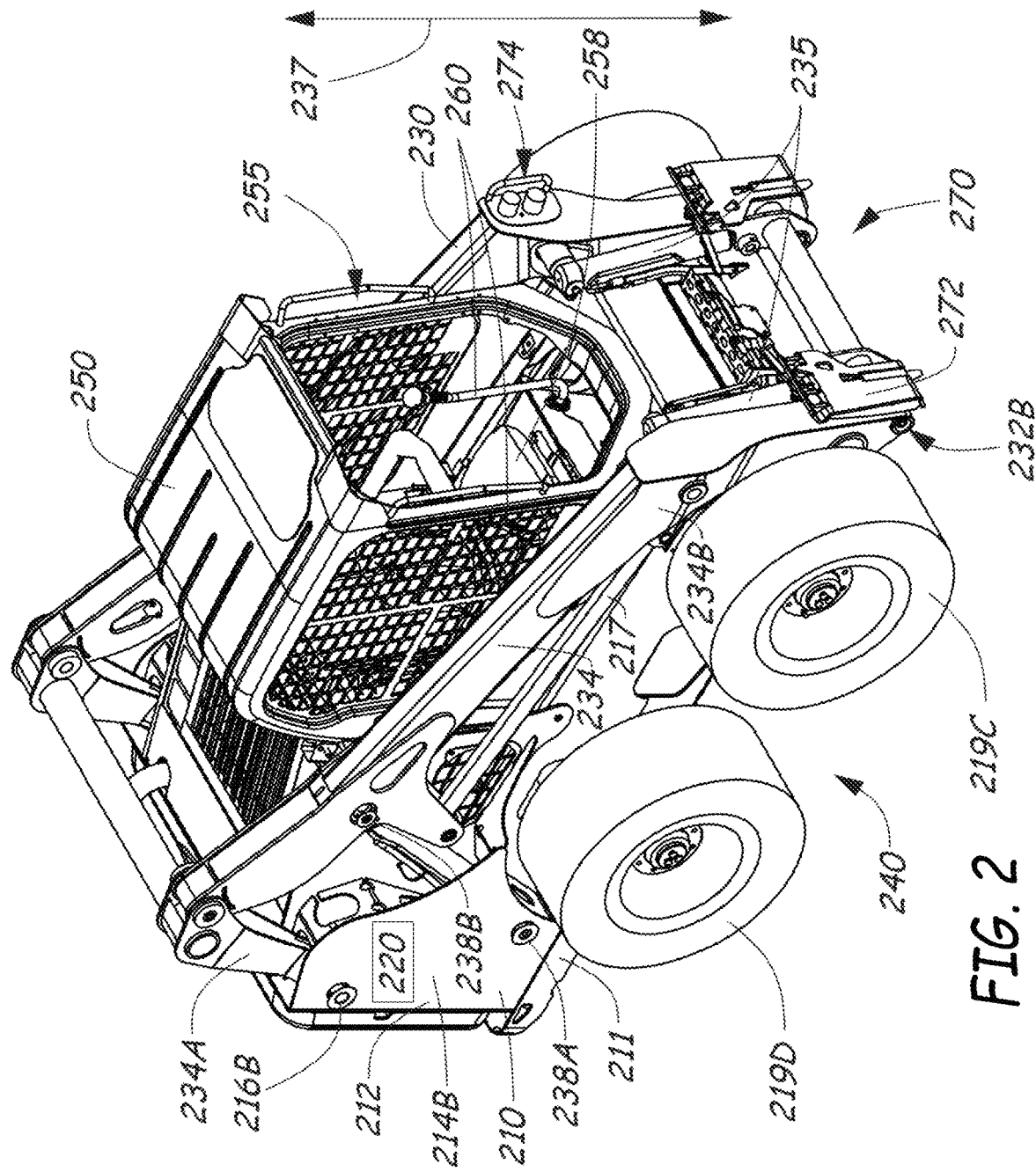
FIGS. 2 and 3 illustrate perspective views of a representative power machine in the form of a skid-steer loader of the type on which the disclosed examples can be practiced.
Figure 3:
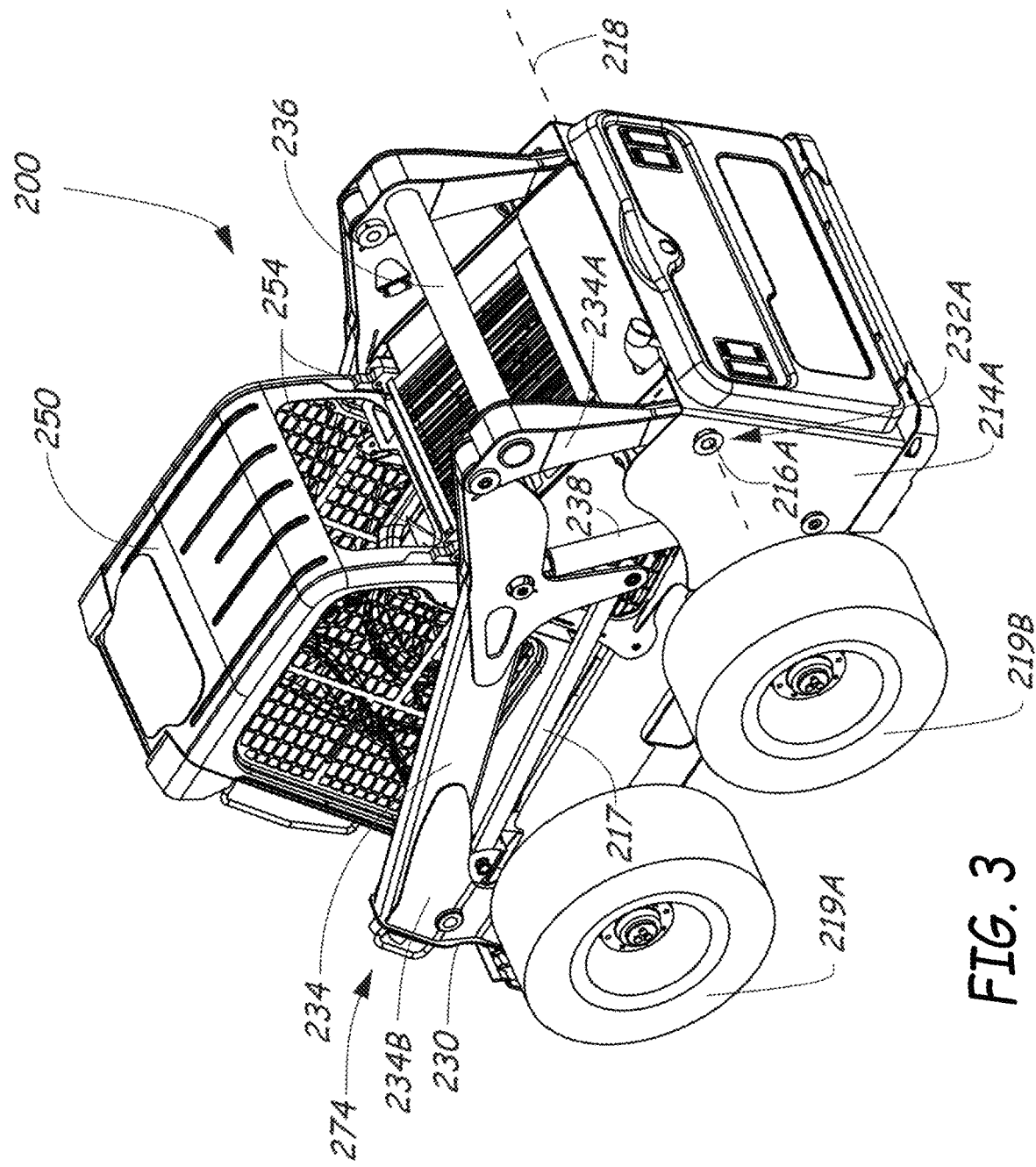

These concepts can be practiced on various power machines, as will be described below. A representative power machine on which the examples can be practiced is illustrated in diagram form in FIG. 1 and one example of such a power machine is illustrated in FIGS. 2 and 3 and described below before any examples are disclosed. For the sake of brevity, only one power machine is illustrated and discussed as being a representative power machine. However, as mentioned above, the examples below can be practiced on any of a number of power machines, including power machines of different types from the representative power machine shown in FIGS. 2 and 3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
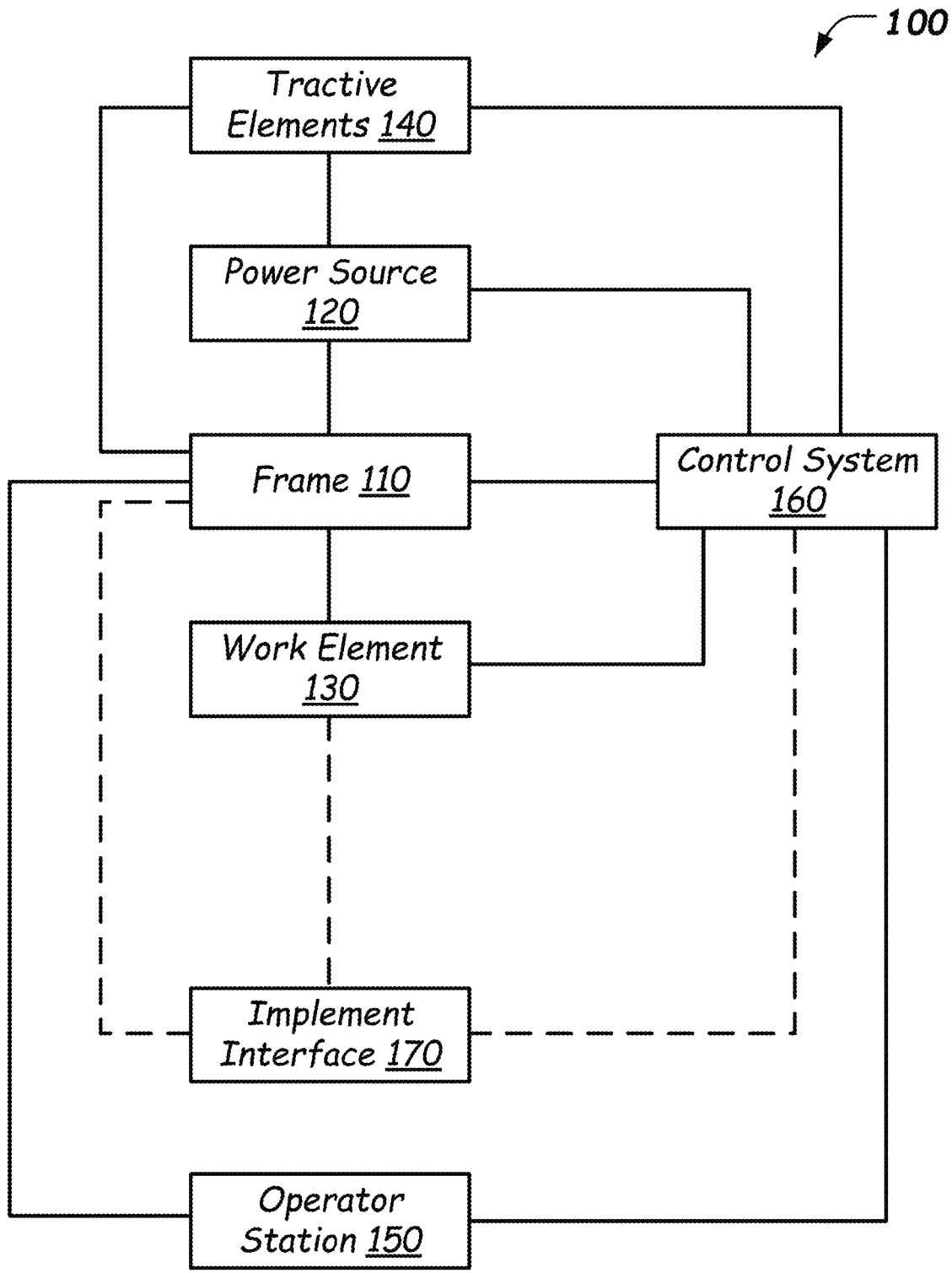
FIG. 1 is a block diagram illustrating functional systems of a representative power machine on which examples of the present disclosure can be advantageously practiced.

FIG. 1 is a block diagram that illustrates the basic systems of a power machine 100, which can be any of a number of different types of power machines, upon which the examples discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e., not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interface 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed examples may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2 and 3 illustrate a loader 200, which is one particular example of a power machine of the type illustrated in FIG. 1 where the examples discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some examples disclosed herein can be implemented on a variety of other power machines. For example, some exemplary implementations can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Loader 200 is described herein to provide a reference for understanding one environment on which the examples described below related to track assemblies and mounting elements for mounting the track assemblies to a power machine may be practiced. The loader 200 should not be considered limiting especially as to the description of features that loader 200 may have described herein that are not essential to the disclosed examples and thus may or may not be included in power machines other than loader 200 upon which the examples disclosed below may be advantageously practiced. Unless specifically noted otherwise, examples disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine. Among the functions that are controlled via operator input devices on loader 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include or interacting with the examples discussed below can have various different frame components that support various work elements. The elements of frame 210 discussed herein are provided for illustrative purposes and frame 210 is not the only type of frame that a power machine on which the examples can be practiced can employ. Frame 210 of loader 200 includes an undercarriage or lower portion 211 of the frame and a mainframe or upper portion 212 of the frame that is supported by the undercarriage. The mainframe 212 of loader 200, in some examples is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214A, 214B) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2 and 3 is one example of many different types of lift arm assemblies that can be attached to a power machine such as loader 200 or other power machines on which examples of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216A, 216B and a second end 232B of each of the lift arms is positioned forward of the frame 210 when in a lowered position as shown in FIG. 2. Joints 216A, 216B are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216A, 216B and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation of the actuators 238 (i.e., extension and retraction) cause the lift arm assembly 230 to pivot about joints 216A, 216B and thereby be raised and lowered along a fixed path illustrated by arrow 237. Each of a pair of control links 217 are pivotally mounted to the frame 210 and one of the lift arms 234 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the lift arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

As briefly mentioned above, the implement interface 270 also includes the power couplers 274 available for connection to an implement on the lift arm assembly 230. The power couplers 274 includes a pressurized hydraulic fluid port to which an implement can be removably coupled. The pressurized hydraulic fluid port selectively provides pressurized hydraulic fluid for powering one or more functions or actuators on an implement. The power couplers 274 can also include an electrical power source for powering electrical actuators or an electronic controller on an implement. The power couplers 274 also exemplarily includes electrical conduits that are in communication with a data bus on the loader 200 to allow communication between a controller on an implement and other electronic devices on the loader 200.

Figure 4:
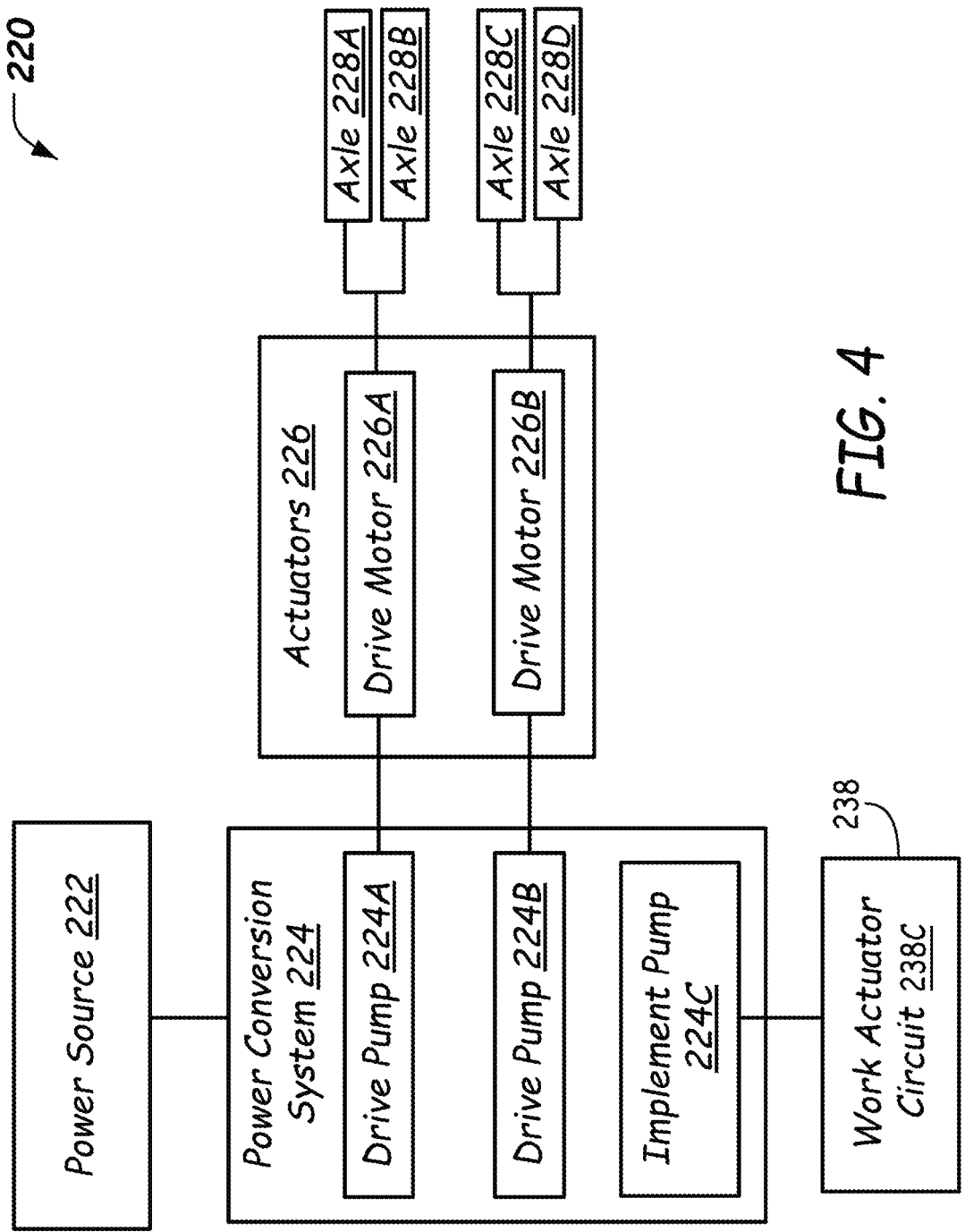
FIG. 4 is a block diagram illustrating components of a power system for a power machine, including the skid-steer loader illustrated in FIGS. 2 and 3.

Frame 210 supports and generally encloses the power system 220 so that the various components of the power system 220 are not visible in FIGS. 2 and 3. FIG. 4 includes, among other things, a diagram of various components of an example configuration of the power system 220. Power system 220 includes one or more power sources 222 that are capable of generating or storing power for use on various machine functions. In some examples, the power system 220 includes an internal combustion engine. Other power machines, including those presented below, can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine.

Power conversion systems in various power machines can include various components, including mechanical transmissions, hydraulic systems, electrical control and transmission systems, and the like. For example, the power conversion system 224 of loader 200 can include a pair of hydrostatic drive pumps 224A and 224B, which are selectively controllable to provide a power signal to drive motors 226A and 226B. The drive motors 226A and 226B in turn can be operably coupled to corresponding axles, e.g., with drive motor 226A being coupled to axles 228A and 228B and drive motor 226B being coupled to axles 228C and 228D. The axles 228A, 228B, 228C, 228D are in turn coupled to tractive elements 219A, 219B, 219C, 219D, respectively. The drive pumps 224A and 224B can be mechanically, hydraulic, or electrically coupled to operator input devices to receive actuation signals for controlling the drive pumps.

The arrangement of drive pumps, motors, and axles in loader 200 is but one example of an arrangement of these components. As discussed above, loader 200 is a skid-steer loader and thus tractive elements on each side of the power machine are controlled together via the output of a single hydraulic pump, either through a single drive motor as in loader 200 or with individual drive motors. Various other configurations and combinations of hydraulic drive pumps and motors can be employed as may be advantageous.

The power conversion system 224 of loader 200 also includes a hydraulic implement pump 224C, which is also operably coupled to both the power source 222 and work actuator circuit 238C. Work actuator circuit 238C can include, for example, lift cylinders 238 and tilt cylinders 235 as well as control logic to control actuation thereof. The control logic selectively allows, in response to operator inputs, for actuation of the lift cylinders or tilt cylinders. In some machines, the work actuator circuit 238C also includes control logic to selectively provide a pressurized hydraulic fluid to an attached implement.

The description of power machine 100 and loader 200 above is provided for illustrative purposes, to provide illustrative environments on which the examples discussed below can be practiced. While the examples discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
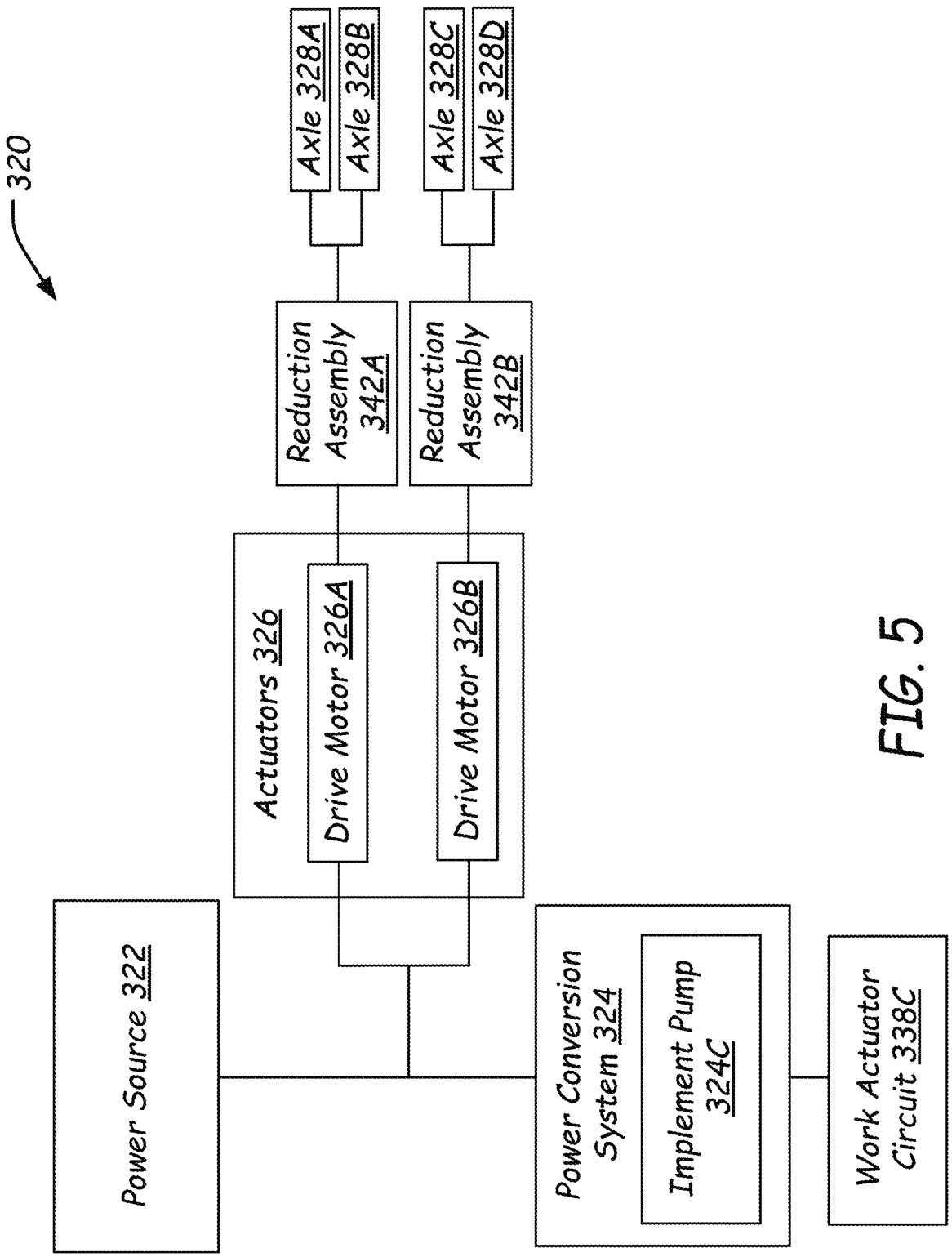
FIGS. 5-7 are block diagrams illustrating components of an example power system of a power machine, which can be implemented for the skid-steer loader illustrated in FIGS. 2 and 3.

As briefly mentioned herein, some power machines can utilize powers sources within a power system other than an internal combustion engine (e.g., the power source 222 of the power system 220 of the loader 200 in FIG. 4) to provide power for various power machine components of the power machine. In this regard, FIG. 5 illustrates another example power system of a power machine according to examples of the present disclosure, which can be implemented on the loader 200 in some cases. To that end, features of power system 320 described below include reference numbers that are generally similar to those used in FIG. 4. For example, power system 320 has a power source 322, just as the power system 220 has the power source 222.

In some aspects, however, the power system 320 differs from the power system 220. In particular, the power source 322 of the power system 320 is an electrical power source (e.g., a rechargeable battery) that is configured to provide electrical power to actuators 326. In the illustrated example, the actuators 326 include electrically operated first and second drive motors 326A, 326B, in contrast to the hydraulically operated drive motors 226A, 226B of the power system 220.

In some cases, a power conversion system 324 of power system 320 can include a hydraulic implement pump 324C (or other hydraulic pump) that is electrically powered by the power source 322 (e.g., via an associated electrical motor) and operably coupled to a work actuator circuit 338C to provide pressurized hydraulic fluid to one or more actuators (such as, e.g., tilt cylinders 235 in FIG. 2 and lift cylinders 238 in FIG. 3). In some examples, however, implement actuators or other non-tractive actuators can be electrically powered actuators that can be powered by the power source 322 instead of the by the hydraulic implement pump 324C. In some examples, the power system 320 can be configured to power one or more electrically operated coolant pumps of a cooling system of the power machine that can be configured to provide coolant to the first and second drive motors 326A, 326B.

In some examples, the power source 322 can include a plurality of rechargeable batteries. In some examples, a first power source (e.g., a first battery assembly) can be configured to power the first and second drive motors 326A, 326B and a second power source (e.g., a second battery assembly) can be configured to power the implement pump 324C or other actuators (such as, e.g., tilt cylinders 235 in FIG. 2 and lift cylinders 238 in FIG. 3).

Referring still to FIG. 5, the drive motors 326A, 326B are each operably coupled to axles, with first drive motor 326A being coupled to first and second axles 328A, 328B and second drive motor 326B being coupled to third and fourth axles 328C, 328D. The axles 328A, 328B, 328C, 328D can in turn be coupled to tractive elements (such as, e.g., the wheels 219A, 219B, 219C, 219D in FIGS. 2 and 3). In some examples, different numbers of motors or axle assemblies can be provided. Similarly, a particular drive motor (e.g., the motor 326A) can in some cases be coupled only to a single corresponding axle assembly (e.g., the axle 328A).

In some examples, the first and second drive motors 326A, 326B can be electrically coupled to operator input devices (such as, e.g., control levers 260 in FIG. 2) that can control operation of the first and second drive motors 326A, 326B. For example, a controller (not shown) of the power machine can be in electrical communication with the power source 322 and the drive motors 326A, 326B to receive signals from the operator input devices and to control the drive motors 326A, 326B based on the received signals.

Because electric motors (e.g., the drive motors 326A, 326B) are typically configured to optimally operate at high speeds, one or more intermediary power transmission components may be required between such a motor and one or more drive axles to alter the output speed or the output torque provided by the electric motor to the drive axle (e.g., to reduce speed and increase torque). Further, such intermediary components can sometimes also provide increased operational efficiency of the electric motors. Accordingly, the power system 320 can further include one or more reduction assemblies (i.e., one or more assemblies configured to operate mechanically to modify a rotational speed of rotational power) arranged to transmit power between a motor and another powered component while reducing the corresponding rotational speed. For example, known configurations of reduction assemblies can include meshed gears, belt drives, chain drives, etc.

In the illustrated example, the power system 320 includes a first reduction assembly 342A and a second reduction assembly 342B. The first reduction assembly 342A is operatively coupled to the first drive motor 326A and to the first and second axles 328A, 328B. Likewise, the second reduction assembly 342B is operatively coupled to the second drive motor 326B and to the third and fourth axles 328C, 328D. In some examples, the power system 320 can include four reduction assemblies, with one reduction assembly operatively coupled to a corresponding one of the axles 328A, 328B, 328C, 328D. In some such examples, the power system 320 can include four drive motors, with one drive motor operatively coupled to a corresponding one of the axles 328A, 328B, 328C, 328D.

Figure 6:
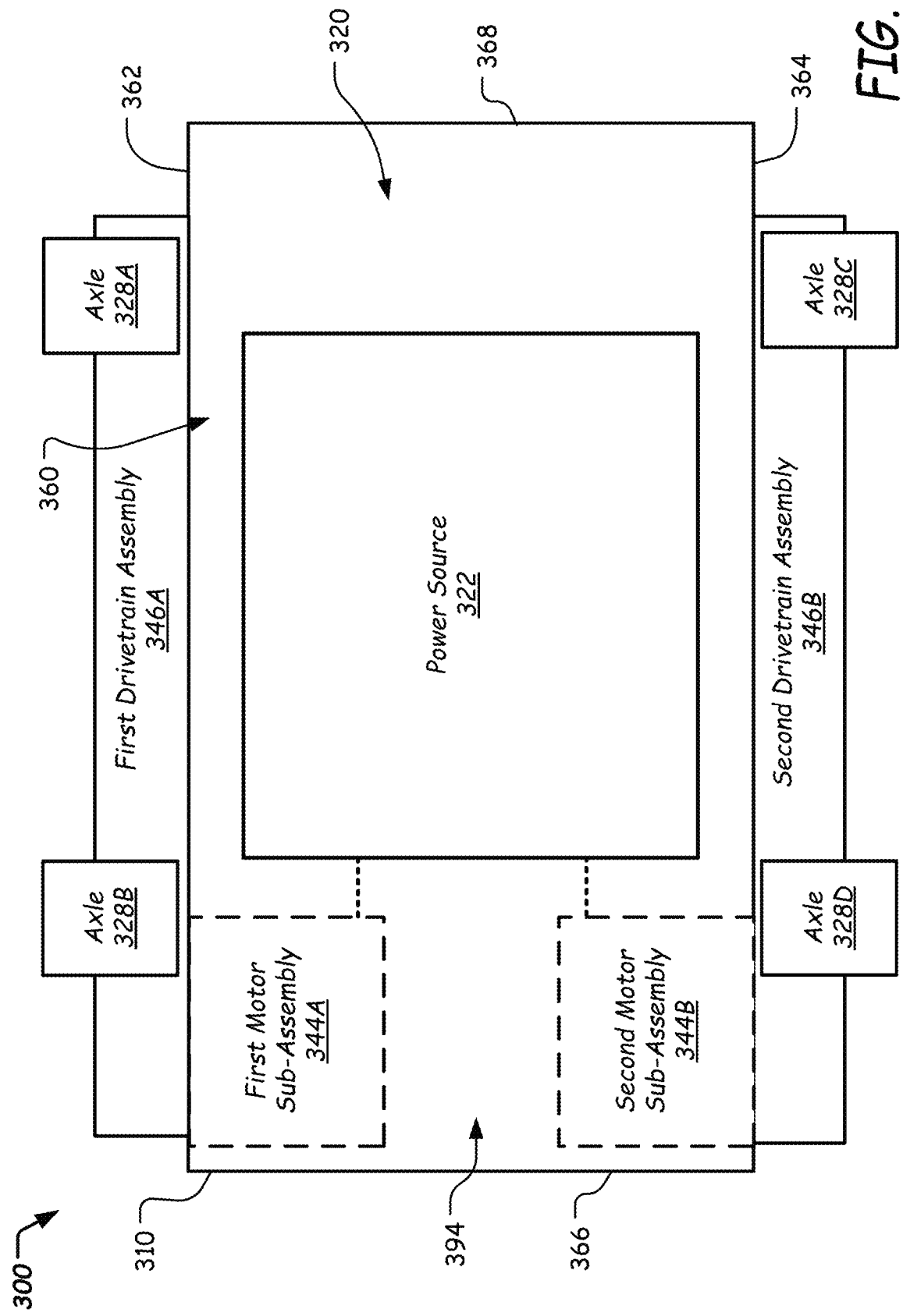
Figure 7:
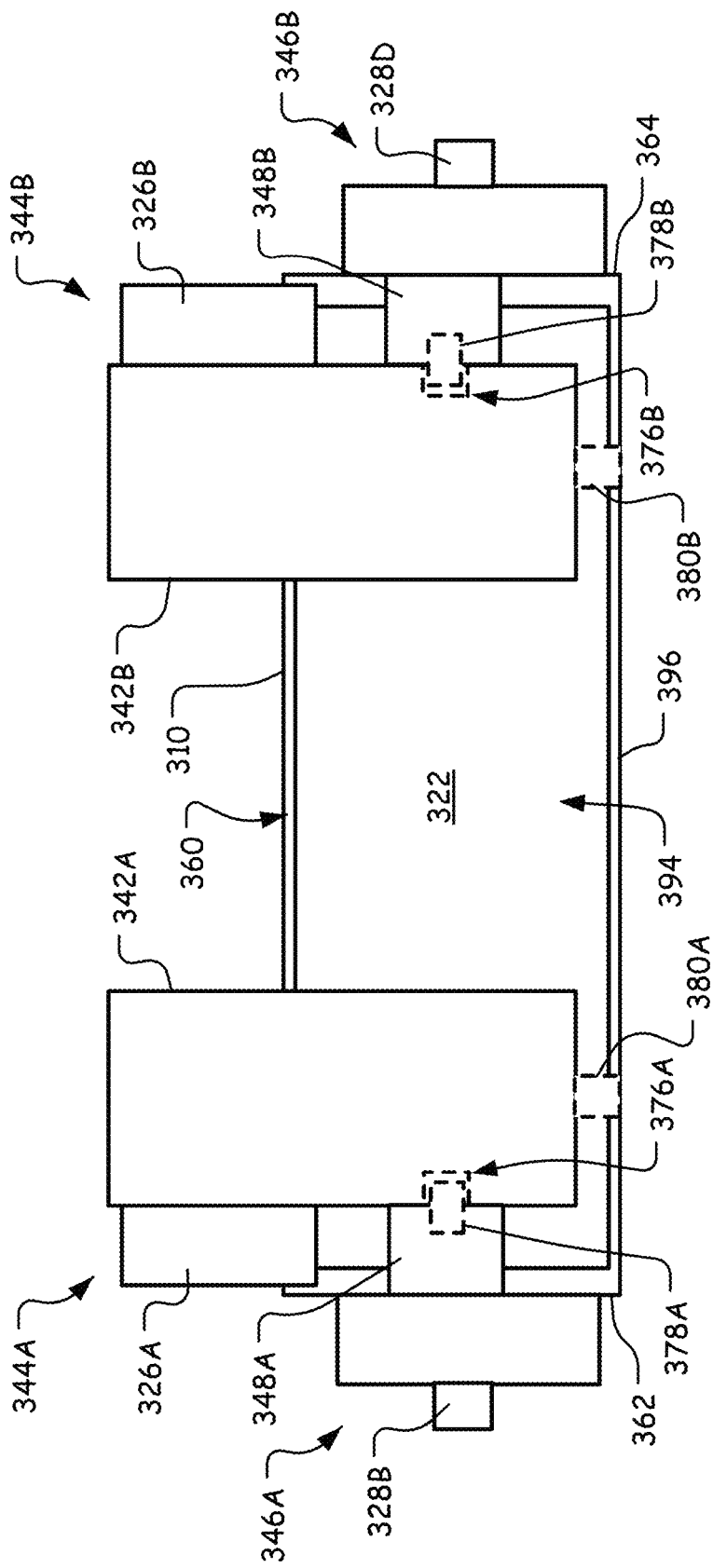

It should be appreciated that the power system 320 of FIG. 5 can be implemented on various power machines in various configurations to provide the benefits of the disclosed technology, including configurations that provide optimized spacing within a frame of the power machine. Accordingly, FIGS. 6 and 7 illustrate an example power machine having the power system 320 of FIG. 5 according to examples of the present disclosure. Power machine 300 of FIGS. 6 and 7 is another particular example of the loader 200 illustrated broadly in FIGS. 2-5 and generally discussed above. To that end, features of power machine 300 described below include reference numbers that are generally similar to those used in FIGS. 2-5 and preceding discussion of particular components generally applies to similarly named and numbered components presented below. For example, power machine 300 is described as having a frame 310 and the power system 320, just as loader 200 has the frame 210 and the power system 220.

In some aspects, the power machine 300 differs from the loader 200 as described above. For example, the power machine 300 includes the example power system 320 (see FIG. 5) that differs from the example power system 220 of the loader 200 (see FIG. 4). In the illustrated example, shown in particular in FIG. 6, the power system 320 can include a first motor sub-assembly 344A and a second motor sub-assembly 344B (as indicated by dashed boxes in FIG. 6, respectively) arranged within a frame cavity 360 of the frame 310. In particular, the two motor sub-assemblies 344A, 344B can be arranged with lateral symmetry relative to a centerline of the frame 310 (and the frame cavity 360), with lateral spacing between particular components as further discussed below. In some examples, however, a different alignment or number of drive sub-assemblies may be provided (e.g., with one drive assembly or more than two drive sub-assemblies, with the drive sub-assemblies non-symmetrically arranged on the frame 310, etc.).

Still referring to FIG. 6, the power source 322 is supported by the frame 310 frontward of the first and second motor sub-assemblies 344A, 344B. Such an arrangement can provide improved placement of the power source 322 for weight distribution (e.g., center of gravity location) and other factors (e.g., general packaging improvements). Further, as generally noted above, an efficiently packaged motor sub-assembly according to the disclosed technology can be installed toward the rear of the frame 310 to provide ample space for the power source 322. For example, the motor sub-assemblies 344A, 344B can be fully rearward of a battery assembly in some cases. In particular examples, as generally illustrated in FIG. 6 and further discussed below, the motor sub-assemblies 344A, 344B can be secured to provide power to the respective drivetrain assemblies 346A, 346B from rearward of a rotational axis of both of the corresponding axles assemblies 328A, 328B and 328C, 238D. In other arrangements, however, a power source may be otherwise located relative to a motor sub-assembly or a motor sub-assembly can be otherwise located relative to a particular axle assemblies.

Generally, the frame cavity 360 can be defined by a first lateral side 362, a second lateral side 364 that is laterally opposite the first lateral side 362, a rear side 366, and a front side 368 that is opposite the rear side 366 of the frame 310. In particular, some frame cavities can be defined between laterally opposed side walls that support (or define) opposing drivetrain assemblies. For example, as shown in FIG. 6, the first lateral side 362 of the frame cavity 360 is defined by an inboard support wall of (and for) a first drivetrain assembly 346A, and the second lateral side 364 of the frame is defined by an inboard support wall of (and for) a second drivetrain assembly 346B. In some examples, other side walls can define a frame cavity (e.g., frame side walls that support distinct forward and rearward drivetrain assemblies on opposing lateral sides of a power machine, rather than a single drivetrain assembly on each lateral side). In some examples, a frame can include two or more frame cavities. In some such examples, motor sub-assemblies can be arranged in different frame cavities from each other or from a power source (e.g., with the motor sub-assemblies in a forward frame cavity and a power source in a rear frame cavity). In some examples, a frame cavity of a power machine frame can define a generally circular or triangular shape.

With continued reference to FIG. 6, the first motor sub-assembly 344A is arranged within the frame cavity 360 along the first lateral side 362 of the frame 310 and is configured to power the first side drivetrain assembly 346A. In the illustrated example, the first drivetrain assembly 346A is arranged along the first lateral side 362 of the frame 310 outboard of the frame cavity 360 and includes the first and second axles 328A, 328B. Likewise, the second motor sub-assembly 344B is arranged within the frame cavity 360 along the second lateral side 364 of the frame 310 and is configured to power the second drivetrain assembly 346B of the power machine 300. The second drivetrain assembly 346B is arranged along the second lateral side 364 of the frame 310 outboard of the frame cavity 360 and includes the third and fourth axles 328C, 328D.

In some cases, as further discussed below, the drivetrain assemblies 346A, 346B can be chain drive assemblies, with the motor sub-assemblies 344A, 344B thus providing rotational power to the axles 328A, 328B and 328C, 238D, respectively. In other cases, other known types of drivetrain assemblies can be similarly (or otherwise) utilized to transmit rotational power from the motor sub-assemblies 344A, 344B to relevant axles and the associated tractive elements.

As also noted above, some examples of the disclosed technology can include improved arrangements of drive system components. In this regard, in the example of FIG. 7, the first motor sub-assembly 344A of the power machine 300 includes the first drive motor 326A (e.g., a first electric motor), the first reduction assembly 342A, and a first bearing carrier 348A. In particular, the first bearing carrier 348A is fixedly attached to and operably supported by the first lateral side 362 of the frame 310 and is operably engaged with the first drivetrain assembly 346A (e.g., via a chain drive, as further discussed above and below). The first reduction assembly 342A is operably supported by the first bearing carrier 348A relative to the frame 310, with the first reduction assembly 342A inboard of the first bearing carrier 348A, and is also operably engaged with the first bearing carrier 348A to power the first drivetrain assembly 346A via the first bearing carrier 348A. The first drive motor 326A is operably supported by the first reduction assembly 342A relative to the first bearing carrier 348A, and thereby supported by the first reduction assembly 342A and the first bearing carrier 348A relative to the frame 310. In particular, the first drive motor 326A can thus be supported to extend outboard of the first reduction assembly 342A, and inboard of the first drivetrain assembly 346A (or other relevant side wall of the frame cavity 360). Thus, the first drive motor 326A can be operably engaged with the first reduction assembly 342A to power the first drivetrain assembly 346A via the first reduction assembly 342A and first bearing carrier 348A, using power from the power source 322.

In some cases, including as shown in FIG. 7, the second motor sub-assembly 344B of the power machine 300 can include a second bearing carrier 348B, a second reduction assembly 342B, and a second drive motor 326B that be arranged similarly to the first motor sub-assembly 344A, but on the opposing lateral side 364 of the power machine 300 (e.g., supported on an opposing side wall of the frame cavity 360). As also discussed below, such a generally symmetrical arrangement can provide various structural and operational benefits, including relative to serviceability (e.g., relative to ease of installation and removal of the motor sub-assemblies 344A, 344B). However, arrangements of motor sub-assemblies may not be laterally (or otherwise) symmetrical in some cases, or may include different or differently arranged components on different sides of a power machine frame.

In some cases, a reduction assembly can be supported relative to a power machine frame only by a bearing carrier or other power transmission sub-assembly. In other cases, a reduction assembly can be further supported by other structural connections with a frame. For example, the first reduction assembly 342A can be removably fixed to a bottom surface 396 of the frame cavity 360 via a first mounting structure (e.g., a first tab 380A at the bottom surface 396 of the frame cavity 360, as shown in FIG. 6). Likewise, the second reduction assembly 342B can be removably fixed to the bottom surface 396 of the frame cavity 360 via a second mounting structure (e.g., a second tab 380B, as shown in FIG. 6).

In some cases, drive motors can be secured relative to a frame only (or primarily) via connection of the drive motors to a motor sub-assembly, which is in turn mounted directly or indirectly to a power machine frame. Correspondingly, in the illustrated example, the drive motors 326A, 326B of the motor sub-assemblies 344A, 344B are attached to the frame 310 only via attachment to the respective reduction assembly 342A, 342B, which may in turn be only (or primarily) supported relative to the frame by the respective bearing carrier 348A, 348B. More specifically, the reduction assemblies 342A, 342B are cantilevered from the respective bearing carriers 348A, 348B (e.g., with the reduction assemblies 342A, 342B only or primarily supported by the bearing carrier 348A, 348B relative to the frame 310), and the drive motors 326A, 326B are cantilevered from the respective reduction assemblies 342A, 342B (e.g., with the drive motors 326A, 326B only or primarily supported by the reduction assemblies 342A, 342B relative to the frame 310 or the bearing carriers 348A, 348B). In some examples, at least the drive motors 326A, 326B can be cantilevered from the respective reduction assemblies 342A, 342B while the reduction assemblies 342A, 342B can be attached to the frame 310 (such as, e.g., via the tabs 380A, 380B).

With continued reference to FIG. 7, the first and second reduction assemblies 342A, 342B can be operably engaged with the first and second bearing carriers 348A, 348B, respectively, in various configurations with various known mechanical connectors used to transmit rotational power. In the illustrated example, the first reduction assembly 342A includes a first tube 376A that is configured to operatively engage a first shaft 378A of the first bearing carrier 348A, and the second reduction assembly 342B includes a second tube 376B that is configured to operatively engage a second shaft 378B of the second bearing carrier 348B. For example, the shafts 378A, 378B can be splined and the tubes 376A, 376B can include a plurality of grooves configured to operatively receive the splined shafts 378A, 378B. In some examples, the shafts 378A, 378B can be included on the reduction assemblies 342A, 342B rather than on the bearing carriers 348A, 348B, respectively, and the tubes 376A, 376B can be included on the bearing carriers 348A, 348B rather than on the reduction assemblies 342A, 342B, respectively. In other examples, similar or other arrangements (not shown) can also be used to operably engage the drive motors 326A, 326B with the reduction assemblies 342A, 342B. Likewise, some examples can include otherwise configured for connecting rotating bodies for power transmission, including any variety of known configurations for interconnection of rotating shafts, gears, flywheels, etc.

It should be appreciated that dimensional configurations of the motor sub-assemblies 344A, 344B can be beneficial to the processes of installing and servicing the motor sub-assemblies 344A, 344B. For example, in some implementations, a laterally spaced arrangement of the reduction assemblies 342A, 342B, relative to each other and to the first and second lateral sides 362, 364 of the frame cavity 360, can permit operators to install or uninstall either of the motor sub-assemblies 344A, 344B (partly or fully) while the other of the sub-assemblies 344A, 344B remains installed (partly or fully) on the frame 310. As one example, as shown in FIG. 7, with the motor sub-assemblies 344A, 344B in an installed configuration within the frame cavity 360, a lateral gap 394 is defined between the installed motor sub-assemblies 344A, 344B. In some examples, the lateral gap 394 can be sufficiently large to allow part or all of the second motor sub-assembly 344B to be removed while the entire first motor sub-assembly 344A remains in place (e.g., with appropriate sizing of the lateral width of the motor sub-assemblies 344A, 344B and components thereof). Accordingly, the disclosed arrangement can permit a lateral movement of the second reduction assembly 342B toward the opposing first reduction assembly 342A that is sufficiently large to allow complete disengagement of the second reduction assembly 342B from the second bearing carrier 348B, without the second reduction assembly 342B needing to be moved by more than the width of the gap 394 (e.g., while the first reduction assembly 342A of the opposing first motor sub-assembly 344A remains installed). Similar dimensional considerations relative to a power transmission interface between the bearing carriers 348A, 348B and the drivetrain assemblies 346A, 346B can similarly allow either of the full motor sub-assemblies 344A, 344B to be installed or uninstalled while the other is already (or still) secured in place.

As a further benefit of the disclosed drive system configurations, an overall width of a power machine can be significantly reduced relative to comparable conventional configurations. In some examples, the disclosed motor sub-assemblies can allow for flexible adoption of various drive motors for frames with chain cases or other outboard drivetrain assemblies. For example, a reduction in overall motor sub-assembly width can allow the use of motors of a range of sizes (or types) to power a drivetrain assembly via a common connection assembly (e.g., via a particularly configured bearing carrier, with the bearing carrier secured at a single predetermined position on an inboard side of a chain case). Thus, for example, some implementations can provide significantly increased flexibility for manufacturers to selectively employ a common frame design with different types of power systems.

Referring now to FIGS. 8-19, an example power machine having a power system is shown according to examples of the present disclosure. Power machine 400 of FIGS. 8-19 is another particular example of the loader 200 illustrated broadly in FIGS. 2-4 and of the power machine 300 illustrated in FIGS. 5-7. To that end, features of power machine 400 described below include reference numbers that are generally similar to those used in FIGS. 2-7 and preceding discussion of particular components generally applies to similarly named and numbered components presented below. For example, power machine 400 is described as having a frame 410 and a power system 420, just as loader 200 has the frame 210 and the power system 220 and as the power machine 300 has the frame 310 and the power system 320. Further, the power system 420 of the power machine 400 is similar to the power system 320 of the power machine 300, in at least that a power source 422 (see FIG. 8) of the power system 420 is a rechargeable battery.

In particular, the power machine 400 includes first and second motor sub-assemblies 444A, 444B as specific examples of the motor sub-assemblies 344A, 344B in FIG. 6. Correspondingly, the motor sub-assemblies 444A, 444B are arranged within a frame cavity 460 that is defined by a first lateral side 462 (e.g., a first lateral side wall) and a second lateral side 464 laterally opposite the first lateral side 462 (e.g., a second lateral side wall). In some cases, a frame cavity can also be otherwise bounded (e.g., at a rear side 466, at a front side 468, and a cavity dividing wall disposed between the rear and front sides 466, 468, etc.).

Figure 10A:
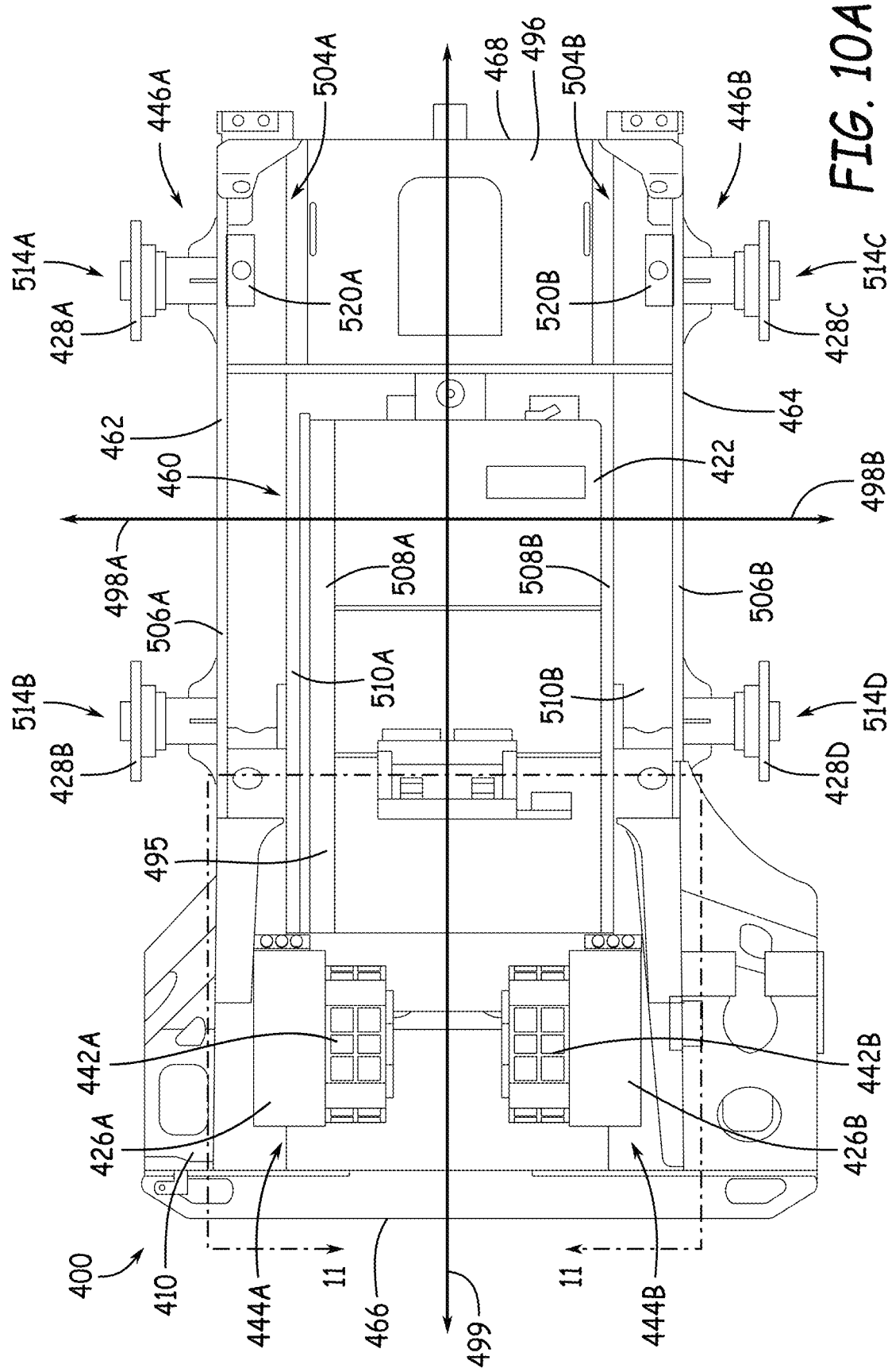
FIG. 10A is a top plan view of the sub-assembly of FIG. 8 with the control system and other components removed for clarity of presentation.

Referring specifically to FIG. 10A, the first motor sub-assembly 444A is arranged within the frame cavity 460 along the first lateral side 462 of the frame 410 and is configured to power a first drivetrain assembly 446A. The first drivetrain assembly 446A is arranged along the first lateral side 462 outboard of the frame cavity 460 and can include first and second axles 428A, 428B (e.g., for wheeled tractive elements (not shown)). Likewise, the second motor sub-assembly 444B is arranged within the frame cavity 460 along the second lateral side 464 of the frame 410 and is configured to power a second drivetrain assembly 446B arranged along the second lateral side 464 of the frame 410 outboard of the frame cavity 460 (e.g., that includes third and fourth axles 428C, 428D). In other words, the first motor sub-assembly 444A (along with the first drivetrain assembly 446A) is arranged on the frame 410 toward a first lateral direction 498A, relative to a front-to-back direction 499 of the power machine 400, along the first lateral side 462 of the frame 410. Similarly, the second motor sub-assembly 444B (along with the second drivetrain assembly 446B) is arranged along the second lateral side 464 of the frame 410, in a second lateral direction 498B that is opposite the first lateral direction 498A.

Figure 11:
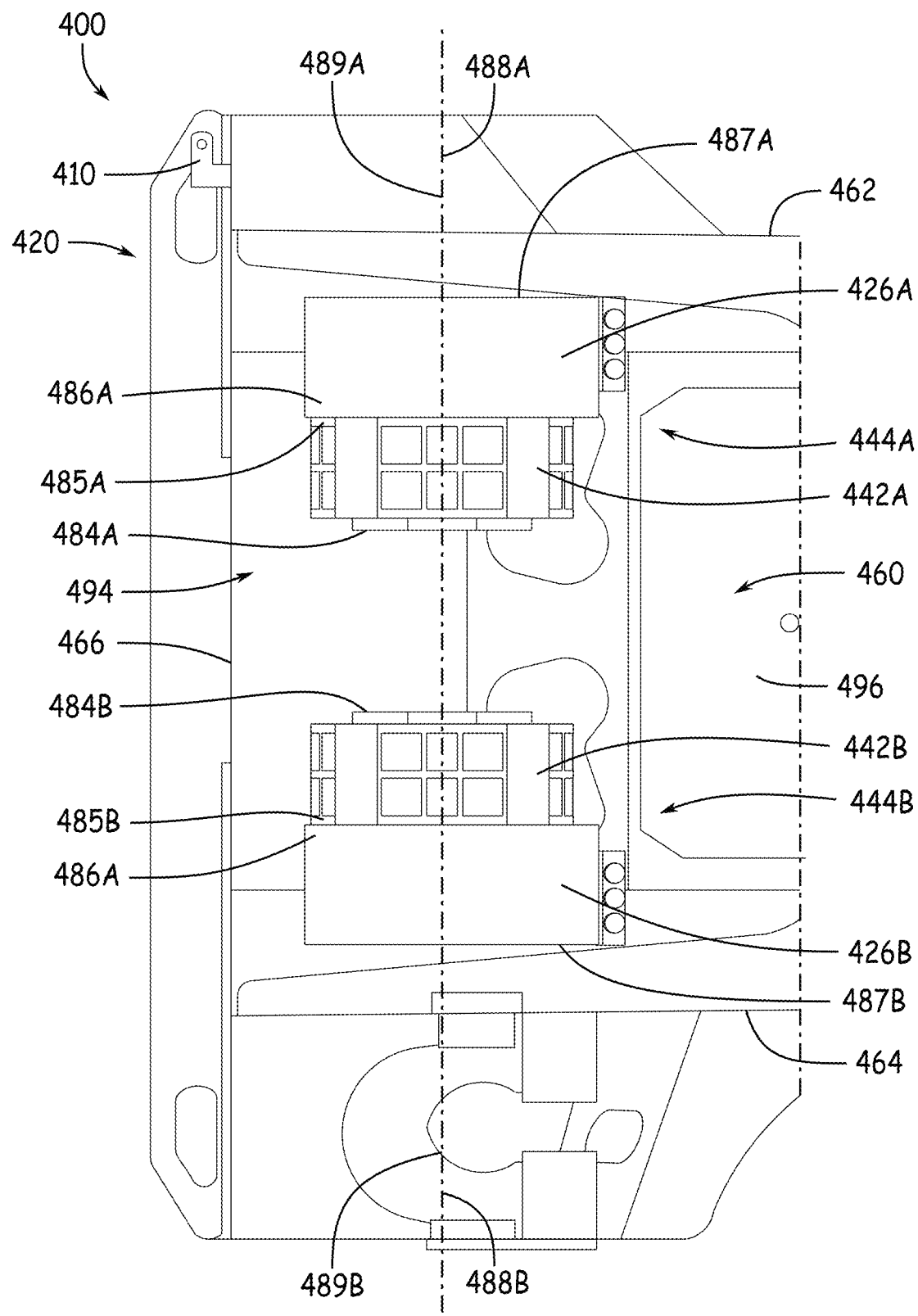
FIG. 11 is a detailed view of area 11-11 of FIG. 10A.
Figure 12:
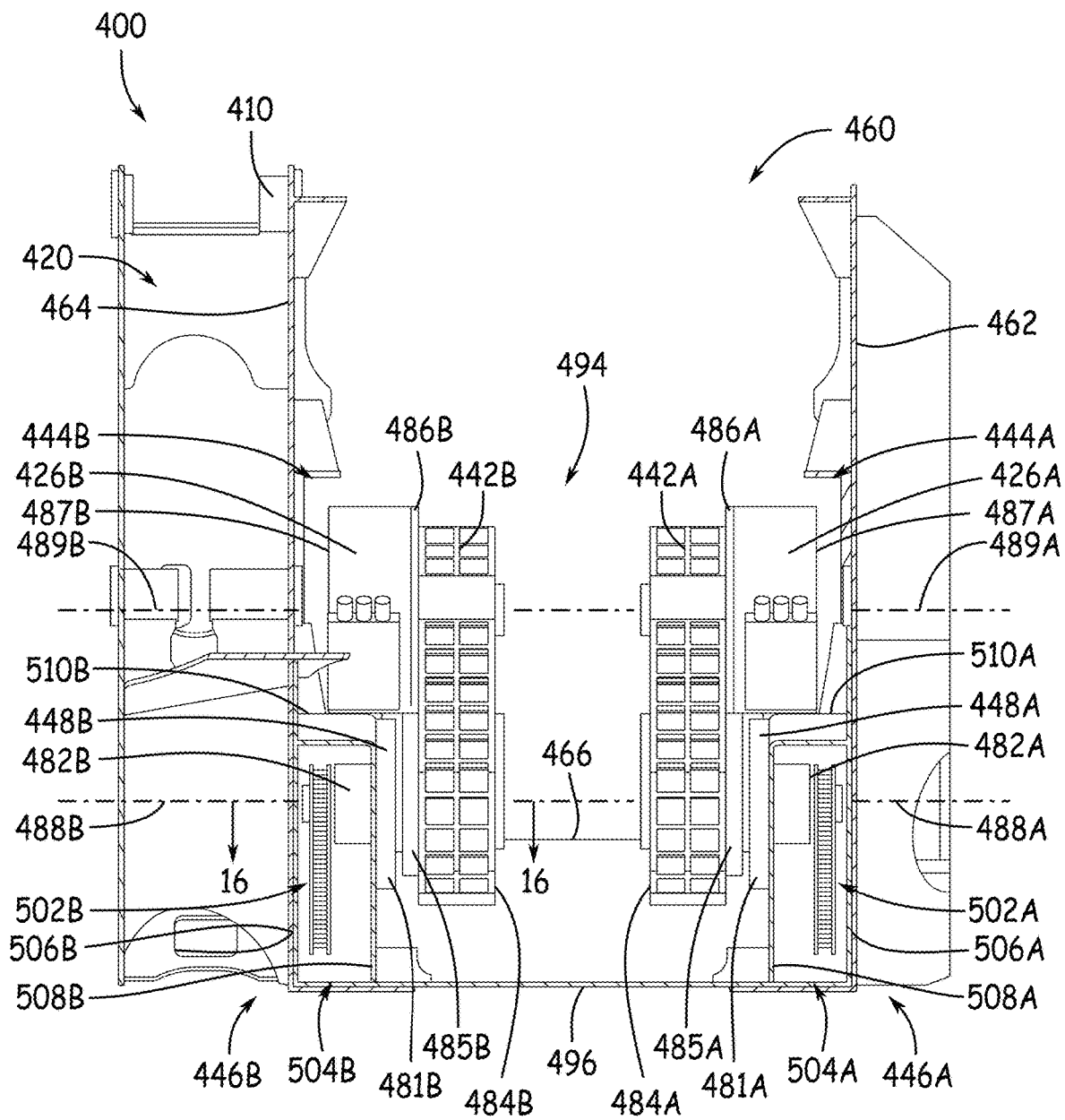
FIG. 12 is a cross-sectional view taken along line 12-12 of FIG. 9 with the power source and the control system removed from the frame.

Referring specifically to FIG. 12, the first motor sub-assembly 444A of the power machine 400 includes a first drive motor 426A (i.e., a first electric motor), a first reduction assembly 442A, and a first bearing carrier 448A. In particular, an outboard side 482A of the first bearing carrier 448A is fixedly attached to the first lateral side 462 of the frame 410 so that the first bearing carrier 448A is operably supported by the first lateral side 462. Thus, an outboard side 485A of the first reduction assembly 442A, opposite an inboard side 484A of the first reduction assembly 442A, is removably attached to an inboard side 481A of the first bearing carrier 448A so that the first reduction assembly 442A is operably supported by the first bearing carrier 448A relative to the frame 410, with the first reduction assembly 442A inboard of the first bearing carrier 448A. An inboard side 486A of the first drive motor 426A, opposite an outboard side 487A, is removably attached to the outboard side 485A of the first reduction assembly 442A. Thus, the first drive motor 426A is operably supported by the first reduction assembly 442A relative to the first bearing carrier 448A, and thereby relative to the frame 410, with the first drive motor 426A outboard of the first reduction assembly 442A and inboard of the first drivetrain assembly 446A (e.g., spaced inboard apart therefrom). As shown in FIGS. 11 and 12, and further discussed below, the first reduction assembly 442A can be oriented such that the first drive motor 426A is above the first bearing carrier 448A with at least part of the first drive motor 426A laterally overlapping with the first bearing carrier 448A (and the drivetrain assembly 446A, in the illustrated example).

As also shown in FIG. 12, a similar arrangement can be used for the second motor sub-assembly 444B of the power machine 400. For example, the second motor sub-assembly 444B can include a second drive motor 426B (i.e., a second electric motor), a second reduction assembly 442B, and a second bearing carrier 448A, with inboard and outboard sides 484B, 485B of the second reduction assembly 442B and inboard and outboard sides 486B, 487B of the second drive motor 426B similarly arranged (and numbered) as described above. As further discussed below, the motor sub-assemblies 444A, 444B can be arranged within the frame cavity 460 such that a lateral gap 494 is defined between the motor sub-assemblies 444A, 444B (e.g., similar to the lateral gap 394 in FIG. 7).

Figure 16:
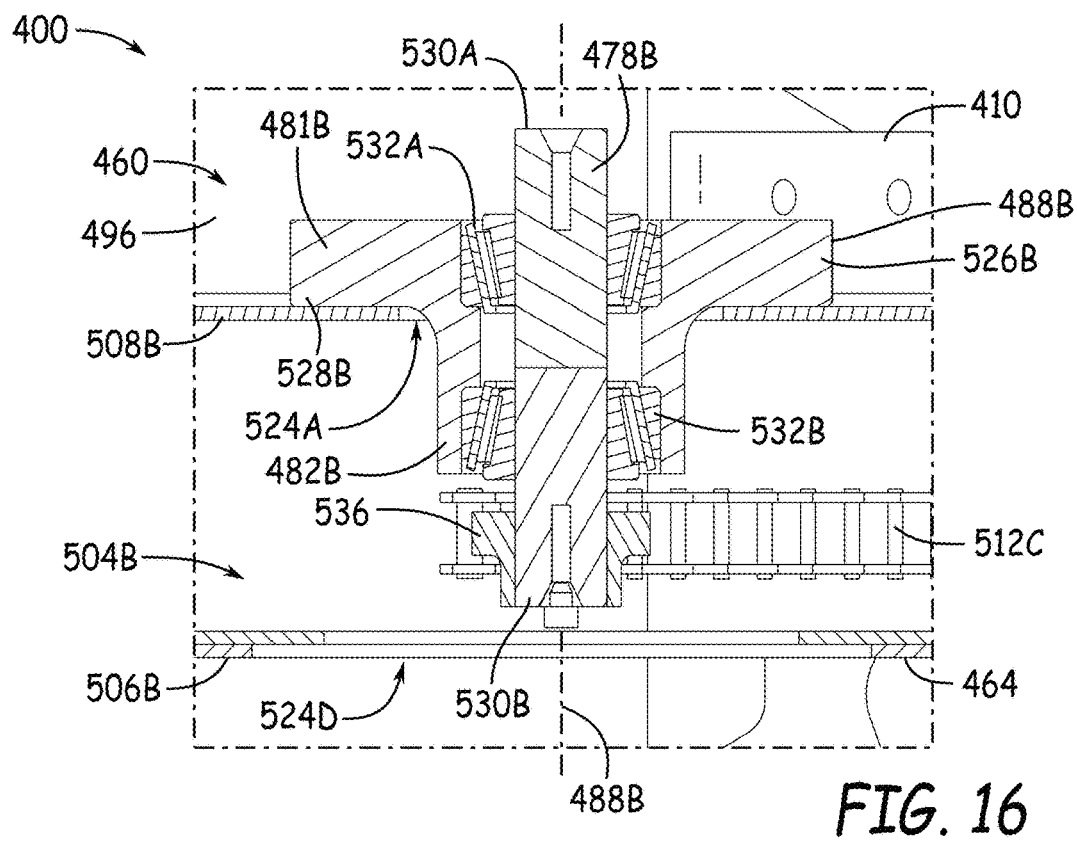
FIG. 16 is a cross-sectional view taken along line 16-16 of FIG. 12.

With continued reference to FIG. 12, first and second power transmission axes 488A, 448B are defined by corresponding shafts for transmission of power from the reduction assemblies 442A, 442B through the corresponding bearing carrier 448A, 448B to the corresponding drivetrain assembly 446A, 446B (see, e.g., a second drive shaft 478B of the second bearing carrier 448B in FIG. 16). Further, the drive motors 426A, 426B have associated drive axes 489A, 489B defined by the rotational axis of the respective motor 426A, 426B (see also FIG. 11).

In some examples, power transmission, drive, or other axes of a motor sub-assembly can be aligned (e.g., horizontally, vertically, or otherwise) with each other or other components. For example, the drive motors 426A, 426B are supported by the reduction assemblies 442A, 442B, respectively, with the drive axes 489A, 489B of the drive motors 426A, 426B disposed above the respective power transmission axes 488A, 488B of the bearing carriers 448A, 448B (i.e., vertically higher than the axes 488A, 488B, relative to a bottom surface 496 of the frame 410 in the illustrated case). Further, in the illustrated example, the drive axes 489A, 489B and the respective power transmission axes 488A, 488B are vertically aligned (i.e., aligned along a common vertical reference line). Still further, the drive axes 489A, 489B are parallel with the respective power transmission axes 488A, 488B. In other examples, however, other arrangements are possible for some or all of the noted axis alignments (or others). For example, in some implementations, the power transmission axes 488A, 488B can be disposed above the drive axes 489A, 489B. In some examples, the drive axes 489A, 489B can be disposed above, but offset forward or rearward relative to the power transmission axes 488A, 488B. Further, as noted above, the motor sub-assemblies 444A, 444B are shown as similarly configured and installed, but generally mirrored about the front-to-back direction 499 for a laterally symmetrical arrangement. However, other arrangements are possible.

In some examples, power transmission, drive, or other axes of a first motor sub-assembly can be aligned (e.g., coaxial) with corresponding axes of an opposed second motor sub-assembly. Referring still to FIG. 12, for example, the first power transmission axis 488A of the first bearing carrier 448A is aligned with the second power transmission axis 488B of the second bearing carrier 448B, relative to the front-to-back direction 499 (see FIG. 10A). Further, the first drive axis 489A of the first drive motor 426A is aligned with the second drive axis 489B of the second drive motor 426B along the front-to-back direction 499. In other words, in the illustrated implementation, each of the power transmission axes 488A, 488B and the drive axes 489A, 489B are at the same location along the front-to-back direction 499. Correspondingly, in some examples, the first drive axis 489A can be coaxial with the second drive axis 489B and the first power transmission axis 488A can be coaxial with the second power transmission axis 488B.

In other examples, however, other arrangements are possible for one or more drive motors, reduction assemblies, or bearing carriers of one or more motor sub-assemblies. For example, in some implementations, the first drive axis 489A of the first drive motor 426A can be offset rearward (or forward) from the second drive axis 489B of the second drive motor 426B, relative to the front-to-back direction 499. In some such examples, the first drive axis 489A of the first drive motor 426A can be arranged forward of the first power transmission axis 488A of the first bearing carrier 448A. Similarly, for example the second drive axis 489B of the second drive motor 426B can be arranged rearward of the second power transmission axis 488B of the second bearing carrier 448B. In some such cases, the power transmission axes 488A, 488B may still remain coaxial with each other.

Figure 10B:
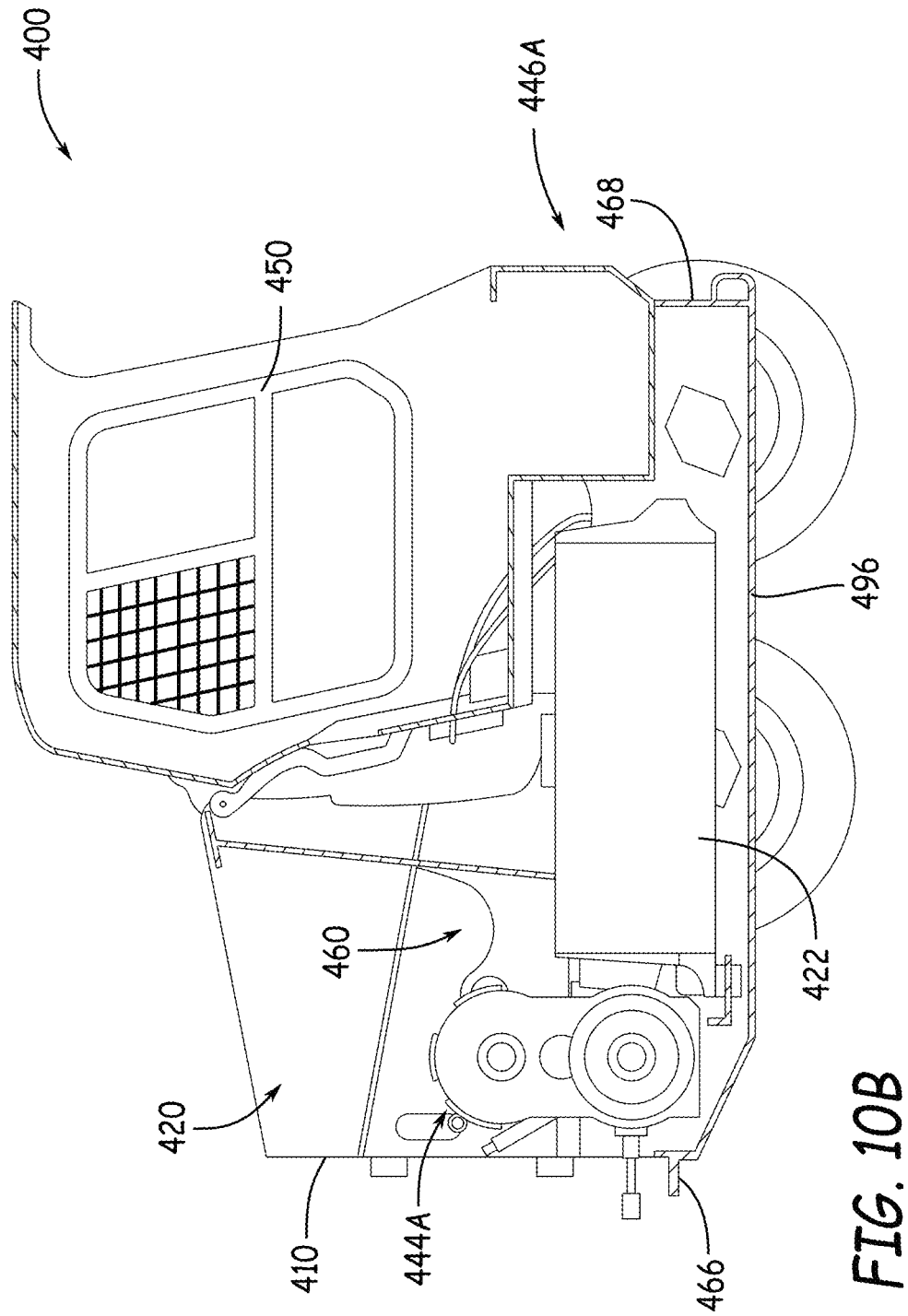
FIG. 10B is a cross-sectional view of an example configuration of the sub-assembly of FIG. 8, with a cab attached to the frame.

Referring specifically to FIGS. 10A and 10B, the arrangement of the motor sub-assemblies 444A, 444B of the power machine 400 within the frame cavity 460 can provide additional space in the frame cavity 460 in comparison to conventional power system arrangements of other power machines. Notably, this arrangement can be particularly beneficial for power machines having power systems that utilize a rechargeable battery as a power source of the power system (i.e., the power source 422), which can require a substantially sized battery or a bank of numerous rechargeable batteries to provide adequate charge capacity. As shown in FIGS. 10A and 10B, for example, the power source 422 of the power system 420 of the power machine 400 is arranged within a frontward portion (i.e., toward the front side 468 of the frame 410) of the frame cavity 460 such that at least a portion of the power source 422 is below a cab 450 (see FIG. 10B) of the power machine 400. In particular, the arrangement of the motor sub-assemblies 444A, 444B in a rearward portion (i.e., toward the rear side 466 of the frame 410) of the frame cavity 460 can provide more available space within the frame 410 so that the size and placement of the power source 422 can be optimized. Further, as shown in FIG. 10A, this arrangement can also provide adequate space for a battery management system 495 of the power machine 400 (e.g., arranged between the first lateral side 462 of the frame 410 and the power source 422) and an electronic control system 497 (see FIGS. 8 and 9) of the power machine 400 (e.g., arranged directly above the power source 422 and the motor sub-assemblies 444A, 444B, for efficient control and cooling operations).

Generally, a wide range of types of reduction assemblies and motors can be used, including non-electric (e.g., hydraulic) motors in some cases. In some examples, the reduction assemblies 442A, 442B can be a gear box configured to provide a speed reduction for power transmission between the respective drive motors 426A, 426B and bearing carriers 448A, 448B. As illustrated, for example, the reduction assemblies 442A, 442B are parallel axis speed-reduction gear boxes with internal meshed gears (not shown). In other examples, belt transmissions, other gear boxes, or other known internal components for reduction assemblies can be used (e.g., with lateral spacing and relative placement of components still generally implemented according to the principles discussed herein). In some examples, a gear box can be a right-angle gear box or other gear box with non-parallel input and output rotational axes. In some examples, the drive motors 426A, 426B can include one or more internal cooling loops with one or more coolant inlets and outlets that can be in fluid communication with a coolant system (not shown) of the power machine 400 to manage thermal operating conditions of the drive motors 426A, 426B during continued operation of the power machine 400.

Generally, the drivetrain assemblies 446A, 446B can have various configurations that operatively engage the bearing carriers 448A, 448B, respectively, to drive the respective axles 428A, 428B, 428C, 428D, and can have various configurations for power transmission from a bearing carrier to one or more axles. An example configuration of the first and second drivetrain assemblies 446A, 446B with the first and second motor sub-assemblies 444A, 444B, respectively, of the power machine 400 is shown in FIG. 13. In the illustrated example, the first and second drivetrain assemblies 446A, 446B of the power machine 400 are a split chain case design such that the axles 428A, 428B, 428C, 428D on each lateral side 462, 464 of the power machine 400 are driven by a single electric motor 426A, 426B via one or more chains.

More specifically, in the example shown, the first drivetrain assembly 446A includes a first chain drive assembly 502A within a first chain case 504A that is operatively engaged by (and operably supports) the first bearing carrier 448A of the first motor sub-assembly 444A to drive rotation of the first and second axles 428A, 428B. Likewise, the second drivetrain assembly 446B includes a second chain drive assembly 502B within a second chain case 504B that is operatively engaged by (and operably supports) the second bearing carrier 448B of the second motor sub-assembly 444B to power rotation of the third and fourth axles 428C, 428D. The chain cases 504A, 504B can be similarly configured in some examples, so discussion of one of the chain cases 504A, 504B herein generally also applies to the other chain case 504A, 504B. However, in other examples, various other configurations are possible including with different axle assemblies on one or both sides of the power machine.

In the illustrated example, the first and second chain cases 504A, 504B (see FIGS. 10A and 12) are enclosed within the first and second lateral sides 462, 464, respectively, of the frame 410. More specifically, and referring again to FIG. 12, the first chain drive assembly 502A is arranged within the first chain case 504A formed along and inboard of the first lateral side 462 of the frame 410 and the second chain drive assembly 502B is arranged within the second chain case 504B formed along and inboard of the second lateral side 464 of the frame 410 opposite the first chain case 504A. The first chain case 504A has an outboard side 506A that is defined by the first lateral side 462 of the frame 410, an inboard side 508A, opposite the outboard side 506A, adjacent to the frame cavity 460, and a top side 510A extending between the inboard and outboard sides 506A, 506B and above the bottom surface 496 of the frame 410. Similarly, the second chain case 504B has an outboard side 506B that is defined by the second lateral side 464 of the frame 410, an inboard side 508B, opposite the outboard side 506B, adjacent to the frame cavity 460, and a top side 510B extending between the inboard and outboard sides 506B, 508B and above the bottom surface 496 of the frame 410.

Figure 14:
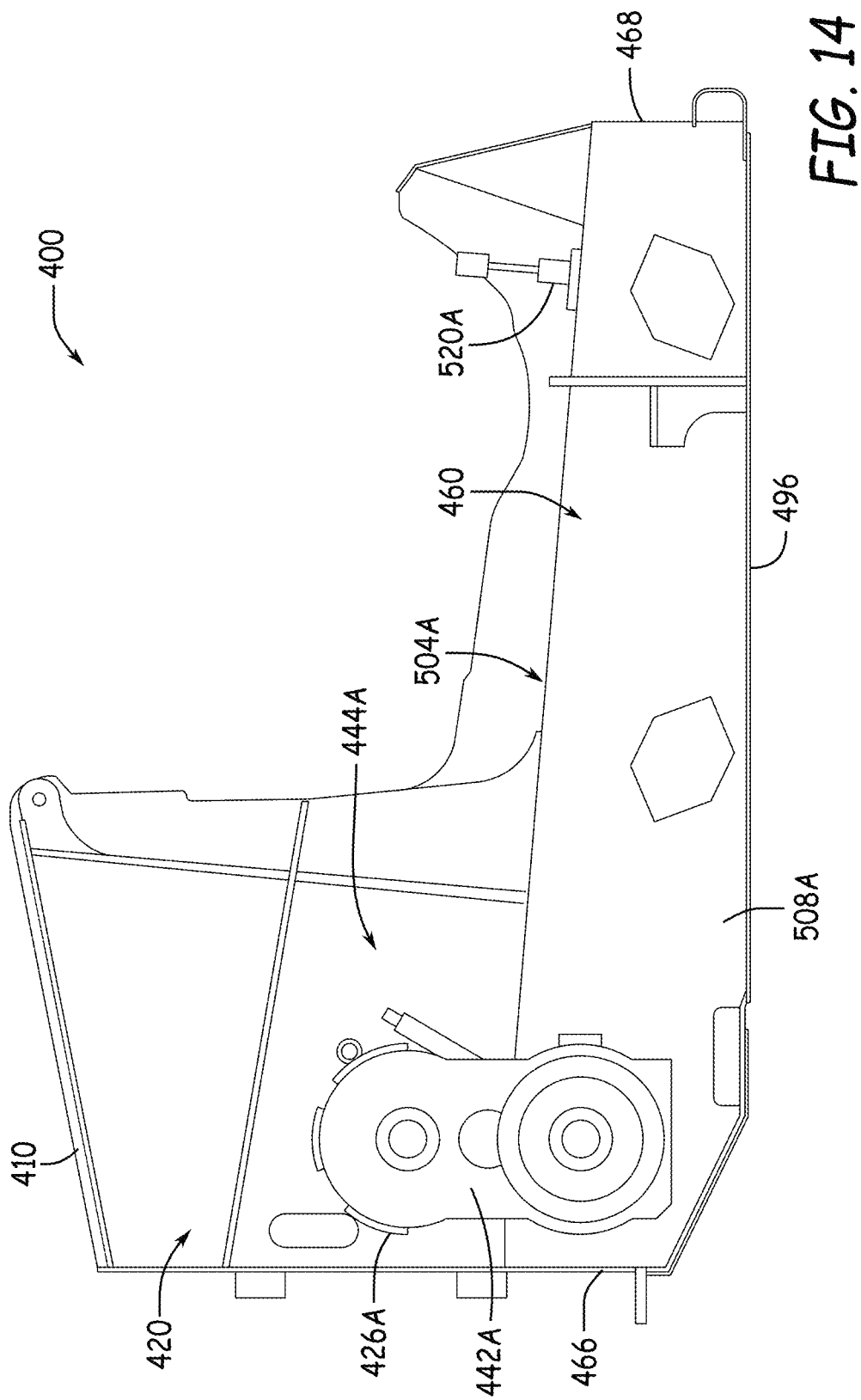
FIG. 14 is a cross-sectional view taken along line 14-14 of FIG. 8 with the power source and the control system removed from the frame.

As shown in FIG. 14, the top sides 510A, 510B of the chain cases 504A, 504B extend at an angle relative to the bottom surface 496 of the frame 410. Further, as shown in FIG. 10A, the chain cases 504A, 504B extend within the frame cavity 460 from the rear side 466 to the front side 468 of the frame 410. In some examples, the chain cases 504A, 504B can be formed outboard of the respective lateral sides 462, 464 of the frame 410. In some such examples, the respective axles 428A, 428B, 428C, 428D of the power machine 400 can extend from the outboard sides 506A, 506B of the chain cases 504A, 504B.

Referring still to FIG. 12, in the illustrated example, the bearing carriers 448A, 448B are mounted to the inboard sides 508A, 508B of the respective chain cases 504A, 504B such that the electric motors 426A, 426B attached to the reduction assemblies 442A, 442B extend above and laterally overlap with the respective chain cases 504A, 504B. Correspondingly, in the illustrated example, the drive axes 488A, 488B of the electric motors 426A, 426B are disposed above the respective chain cases 504A, 504B and the one or more chains arranged therein. In some examples, the electric motors 426A, 426B can contact (e.g., removably attached to) the respective top sides 510A, 510B of the chain cases 504A, 504B.

In the illustrated configuration, as also alluded to above, the chain cases 504A, 504B are configured to transmit power from the bearing carriers 448A, 448B, respectively, to separate axles using separate chains. For example, referring again to FIG. 13, the first bearing carrier 448A operatively engages a first drive chain 512A of the first chain drive assembly 502A that extends from the first bearing carrier 448A to a second axle assembly 514B that includes the second axle 428B. A second drive chain 512B of the first chain drive assembly 502A extends from the second axle assembly 514B to a first axle assembly 514A that includes the first axle 428A to provide tractive power to the first axle assembly 514A via the second axle assembly 514B.

Similarly, the second bearing carrier 448B operatively engages a third drive chain 512C of the second chain drive assembly 502B that extends from the second bearing carrier 448B to a fourth axle assembly 514D that includes the fourth axle 428D. A fourth drive chain 512D of the second chain drive assembly 502B extends from the fourth axle assembly 514D to a third axle assembly 514C that includes the third axle 428C to provide tractive power to the third axle assembly 514C via the fourth axle assembly 514D.

In other words, in the illustrated example, the drive chains 512A, 512B, 512C, 512D of the chain drive assemblies 502A, 502B are driven simultaneously by respective bearing carriers 448A, 448B to simultaneously power respective forward and rear ground engaging elements of the first and second drivetrain assemblies 446A, 446B (e.g., tractive elements similar to the wheels 219A, 219B, 219C, 219D of the loader 200 in FIG. 3). In particular, the drive chains 512A, 512C are directly driven via the bearing carriers 448A, 448B, and the drive chains 512B, 512D are indirectly driven, via the axle assemblies 514B, 514D.

In some examples, instead of utilizing drive chains (e.g., the drive chains 512A-D), the power machine 400 may utilize one or more drive belts. For example, the power machine 400 may utilize four (4) drive belts in place of the four (4) drive chains (e.g., the drive chains 512A-D). Further, in some examples, rather than utilizing a pair (e.g., two) drive chains or drive belts per each chain case (e.g., chain cases 504A, 504B), the power machine 400 may utilize only a single drive chain or drive belt per each chain case (e.g., one drive chain or drive belt for chain case 504A and one drive chain or drive belt for chain case 504B). As should be appreciated, for each chain case, the single drive chain or drive belt may engage each of the bearing carrier, first axle assembly, and the second axle assembly to provide tractive power to the axles.

In some examples, a drivetrain assembly of a power machine can include a locking brake system that can be configured to directly engage an axle of the drivetrain assembly to stop rotation of the axle (and thus also one or more other axles that are driven by the drivetrain assembly), including to park the power machine. In some examples, the disclosed configuration can allow for a more accessible and otherwise improved arrangement for such a brake system. For example, referring to FIGS. 10A and 14, the first drivetrain assembly 446A includes a first locking brake 520A mounted to the top side 510A of the first chain case 504A and arranged to engage the first axle assembly 514A (see FIG. 13) of the first chain drive assembly 502A, and the second drivetrain assembly 446B includes a second locking brake 520B mounted to the top side 510A of the second chain case 504B and arranged to engage the third axle assembly 514C (see FIG. 13) of the second chain drive assembly 502B.

As discussed in greater detail below, the first and second locking brakes 520A, 520B can be configured to lock the first and second drivetrain assemblies 446A, 446B by engaging the first and third axle assemblies 514A, 514C, respectively. Further, with separate locking brakes 520A, 520B for the chain drive assemblies 502A, 502B, the drivetrain assemblies 446A, 446B of each lateral side 462, 464 of the power machine 400 can be locked independently. In the illustrated example, the first and second locking brakes 520A, 520B are arranged adjacent to the front side 468 of the frame 410 while the first and second motor sub-assemblies 444A, 444B are arranged adjacent to the rear side 466 of the frame 410. In some examples, the first and second locking brakes 520A, 520B can be arranged to engage the second and fourth axle assemblies 514B, 514D, respectively. In some examples, the first drivetrain assembly 446A can include two locking brakes that are configured to simultaneously (or otherwise) engage the first and second axle assemblies 514A, 514B and the second drivetrain assembly 446A can include two locking brakes that are configured to simultaneously engage the third and fourth axle assemblies 514C, 514D.

An example configuration of the second bearing carrier 448B of the second motor sub-assembly 444B and the second chain drive assembly 502B of the second drivetrain assembly 446B of the power machine 400 is shown in greater detail in FIGS. 15-19. In the illustrated example, the first bearing carrier 448A and the first drivetrain assembly 446A are generally similar to the second bearing carrier 448B and the second drivetrain assembly 446B, but mirrored about a central axis of the frame 410. For example, the first bearing carrier 448A can include a first drive shaft (not shown) just as the second bearing carrier 448B includes a second drive shaft 478B (see FIG. 16). Further, in the illustrated example, the first and second bearing carriers 448A, 448B are aligned along the front-to-back direction 499 (see FIG. 10A), with both bearing carriers 448A, 448B arranged closer to the rear side 466 of the frame 410 than the front side 468 (see FIGS. 10A and 10B). In other examples, the bearing carriers 448A, 448B can have differing configurations or can be located at differing distances relative to the rear side 466 of the frame 410 or the respective axles.

Referring specifically to FIG. 16, the second bearing carrier 448B of the second motor sub-assembly 444B is mounted to a carrier opening 524A along the inboard side 508B of the second chain case 504B. More specifically, the second bearing carrier 448B has a carrier flange 526B at the inboard side 481B that defines an outboard mounting face 528B of the second bearing carrier 448B that is attached to the inboard side 508B of the second chain case 504B. Further, with the bearing carrier 448B thus installed, the outboard side 482B of the second bearing carrier 448B extends into the second chain case 504B towards the outboard side 506B of the second chain case 504B. In some examples, a further axle opening 524D (see also FIGS. 8 and 13) can be provided for access to the bearing carrier 448B from outboard of the chain case 504B (as also discussed below).

In particular, the second drive shaft 478B of the second bearing carrier 448B can extend through the inboard and outboard sides 481B, 482B of the second bearing carrier 448B such that a first (or inboard) end 530A of the second drive shaft 478B is disposed within the frame cavity 460 and a second (or outboard) end 530B of the second drive shaft 478B is disposed within the second chain case 504B. More specifically, in the illustrated example, the first end 530A of the second drive shaft 478B extends laterally inward from the inboard side 481B of the second bearing carrier 448B and is configured to be received within a second tube of the second reduction assembly 442B (e.g., the second tube 376B in FIG. 7). Meanwhile, the second end 530B of the second drive shaft 478B extends laterally outward from the outboard side 482B of the second bearing carrier 448B, into the second chain case 504B.

With continued reference to FIG. 16, the second bearing carrier 448B further includes a first (or outboard) main bearing 532A at the outboard side 482B and a second (or inboard) main bearing 532B at the inboard side 481B. The first and second main bearings 532A, 532B are configured to receive the second drive shaft 478B and to generally reduce oscillations of the rotating second drive shaft 478B during operation of the power machine 400. In the illustrated example, the first main bearing 532A is disposed outboard of the outboard mounting face 528B, within the second chain case 504B, while the second main bearing 532B is disposed inboard of the second chain case 504B, within the frame cavity 460. In some examples, both of the main bearings 532A, 532B can be disposed within the second chain case 504B. In some examples, the second bearing carrier 448B can include three or more main bearings with one or more main bearings disposed inboard of the second chain case 504B.

Still referring to FIG. 16, a drive sprocket 536 is arranged on the second end 530B of the second drive shaft 478B and within the second chain case 504B. The drive sprocket 536 of the second bearing carrier 448B is configured to rotationally engage the third drive chain 512C of the second chain drive assembly 502B. Thus, as discussed in greater detail below, rotation of the second drive shaft 478B, as powered by the second electric motor 426B, can power the axles 428C, 428D via the chains 512C, 512D of the second chain drive assembly 502B. In other examples, however, differently configured shafts can permit bearing carriers to power differently configured axle assemblies.

Referring to FIG. 17, the fourth axle assembly 514D of the second chain drive assembly 502B includes a first (or inboard) axle sprocket 540A and a second (or outboard) axle sprocket 540B attached to a first (or inboard) end 542A of the fourth axle 428D and a fourth axle hub 544D attached to a second (or outboard) end 542B of the fourth axle 428D. In the illustrated example, the fourth axle 428D is received within a fourth axle tube 546D extending outwardly from the outboard side 506B of the second chain case 504B (i.e., the second lateral side 464 of the frame 410) such that the first and second axle sprockets 540A, 540B are disposed within the second chain case 504B and the fourth axle hub 544D is disposed outboard of the second lateral side 464 of the frame 410. The first axle sprocket 540A is configured to rotationally engage the fourth drive chain 512D and the second axle sprocket 540B is configured to rotationally engage the third drive chain 512C. Thus, the fourth axle 546D can be driven by rotation of the second drive shaft 478B (see FIG. 16) of the second bearing carrier 448B via the third drive chain 512C that is rotationally engaged by the drive sprocket 536 of the second drive shaft 478B and the second axle sprocket 540B of the fourth axle assembly 514D. Further, referring in particular again to FIG. 13, the laterally outboard positioning of the drive sprocket 536 and the two-sprocket configuration of the axle assembly 514D can provide for particularly efficient packaging as well as beneficially aligned transmission forces.

In the illustrated example, the first and second axle sprockets 540A, 540B have diameters that are substantially equal. In some examples, the first axle sprocket 540A can have a diameter that is different than that of the second axle sprocket 540B. In some examples, the second axle sprocket 540B can be arranged on the fourth axle 428D inboard of the first axle sprocket 540A. In some examples, a fourth axle opening 524C can be defined along the inboard side 508B of the second chain case 504B adjacent to the first end 542A of the fourth axle 428C to provide access to the fourth axle assembly 514D from the frame cavity 460.

Referring to FIG. 18, the third axle assembly 514C of the second chain drive assembly 502B includes a third axle sprocket 540C attached to a first (or inboard) end 550A of the third axle 428C and a third axle hub 544C attached to a second (or outboard) end 550B of the third axle 428C. Similar to the fourth axle 428D, the third axle 428C is received within a third axle tube 546C extending outwardly from the outboard side 506B of the second chain case 504B (i.e., the second lateral side 464 of the frame 410) such that the third axle sprocket 540C is disposed within the second chain case 504B and the third axle hub 544C is disposed outboard of the second lateral side 464 of the frame 410. The third axle sprocket 540C is configured to be rotationally engaged by the fourth drive chain 512D. Thus, the third axle 428C can be driven by rotation of the second drive shaft 478B (see FIG. 16) of the second bearing carrier 448B, via—successively—the drive sprocket 536, the third drive chain 512C, the first axle sprocket 540A, the second axle sprocket 540B, and the fourth drive chain 512D.

In some examples, the first, second, and third axle sprockets 540A, 540B, 540C can have diameters that are substantially equal. In other examples, the third axle sprocket 540C of third axle assembly 514C can have a diameter that is different than that of one or both of the first and second axle sprockets 540A, 540B of the fourth axle assembly 514D. In some examples, a third axle opening 524B (see also FIG. 8) can be defined along the inboard side 508B of the second chain case 504B adjacent to the first end 550A of the third axle 428C to provide access to the third axle assembly 514C from the frame cavity 460.

In some examples, a chain drive assembly of a drive chain assembly of a power machine can include one or more components configured to generally provide tension to one or more chains to reduce or prevent noise from the chains (i.e., "chain slap" as known in the art) during operation of the power machine. Referring to FIG. 19, the second chain drive assembly 502B includes a second idler sprocket assembly 554B arranged between the third and fourth axle assemblies 514C, 514D that is configured to rotationally engage the fourth drive chain 512D. More specifically, the idler sprocket assembly 554B is arranged within the second chain case 504B and includes an idler base 556 attached to the bottom surface 496 of the frame 410 to support an idler sprocket 558 that tensions the fourth drive chain 512D. In some examples, the idler base 556 can be configured such that the height of the idler sprocket 558 relative to the bottom surface 496 of the frame 410 is adjustable by an operator. In some examples, the idler base 556 can be attached to the top side 510B of the second chain case 504B. In some examples, the second chain drive assembly 502B can include two or more idler sprocket assemblies that can be configured to engage one or both of the third and fourth drive chains 512C, 512D. As shown in FIG. 13, the first chain drive assembly 502A can include a first idler sprocket assembly 554A arranged between the first and second axle assemblies 514A, 514B and configured similar to the second idler sprocket assembly 554B.

As briefly mentioned above, the second locking brake 520B of the second drivetrain assembly 446B is arranged to engage the third axle assembly 514C of the second chain drive assembly 502B. Such an arrangement, for example, can allow for use of a relatively larger brake disc with correspondingly slower movement at any point of contact with the brake 520B. Further, placement of such a brake at a front axle can provide increased space for efficient arrangement of other drive components, including those detailed above and below.

In some examples, as shown in FIGS. 18 and 19, the second locking brake 520B is configured as a wedge brake that engages a brake disc 560 of the third axle assembly 514C. As shown in FIG. 18, the brake disc 560 is arranged on the third axle 428C outboard of the third axle sprocket 540C between the third axle sprocket 540C and the third axle tube 546C. The brake disc 560 includes a plurality of lugs 562 (see FIG. 19) extending radially outward from the brake disc 560. Correspondingly, a wedge 568 can be moved between a first (or disengaged) position and a second (or engaged) position by a solenoid 566 or other brake actuator to control engagement of the wedge 568 to stop rotation of the brake disc 560 (and thereby the axle assembly 514C, generally). For example, the wedge 568 can be biased toward the second (engaged) position by a biasing member 570 (e.g., a coil spring) and thus de-energization of a solenoid 566 can result in the wedge 568 moving to the second position (i.e., toward the third axle 428C). Thus, the brake 520B can lock the axle assembly 514C against further rotation.

In some implementations, devices or systems disclosed herein can be utilized or configured for operation using methods embodying aspects of the present disclosure. Correspondingly, description herein of particular features, capabilities, or intended purposes of a device or system is generally intended to inherently include disclosure of a method of using such features for the intended purposes, a method of implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as examples of the disclosed technology, of the utilized features and implemented capabilities of such device or system.

In this regard, some examples of the present disclosure can include a method for installing or otherwise servicing one or more motor sub-assemblies of a power system of a power machine. Referring again to FIG. 10A and as discussed above, the motor sub-assemblies 444A, 444B can generally exhibit lateral spacing and widths to allow for installation or removal from the frame 410 independently of each other, including with the other sub-assembly 444B, 444A already installed on the frame 410 (such as, e.g., via the defined lateral gap 494 between the motor sub-assemblies 444A, 444B). In some cases, such operations can include assembling together the reduction assemblies 442A, 442B the drive motors 426A, 426B, and the bearing carriers 448A, 448B, respectively, then attaching the bearing carriers 448A, 448B to the frame 410. In other cases, the first or second reduction assemblies 442A, 442B (e.g., along with the attached first or second drive motors 426A, 426B) can be attached to or removed from the respective first or second bearing carriers 448A, 448B at other times.

As one particular example, FIG. 20 illustrates a method 600 for assembling a power machine, as can be implemented, for example, on the power machines 300, 400 with the power systems 320, 420 illustrated in FIGS. 5-19. Method 600 can generally include securing a motor sub-assembly on a corresponding lateral side of the power machine, to power one or more tractive elements on that lateral side. Accordingly, for example, the method 600 can include (at block 610) securing a bearing carrier to a frame sidewall on a lateral side of the power machine to power a front axle and a rear axle along the lateral side of the power machine. For example, referring again to FIG. 16, the bearing carrier 448B can be aligned with the opening 524A, and then accessed via the opening 524D (see also FIGS. 8 and 13) to be secured in place relative to the frame 410.

Continuing, the method 600 can further include (at block 620) securing a reduction assembly to be inboard of the first bearing carrier and the first frame sidewall. For example, with the first bearing carrier secured to the frame sidewall, operations at block 620 can include securing a gearbox or other reduction assembly to be cantilevered inboard from a bearing carrier, with the bearing carrier secured to the sidewall (e.g., via operations at block 610). Operations at block 630 of method 600 can then further include securing an electric motor outboard from the reduction assembly (e.g., and also at least partly inboard of the frame sidewall). For example, operations at block 630 can include securing a motor to be cantilevered outboard from a gearbox or other reduction assembly.

As also noted generally below, the operations in FIG. 20 are not necessarily illustrated in temporal order. Correspondingly, for example, an electric motor can sometimes be secured to a reduction assembly (e.g., at block 630) before the reduction assembly is secured to a bearing carrier (e.g., at block 620). Similarly, in some cases, a reduction assembly can be secured to a bearing carrier (e.g., at block 620) before the bearing carrier is secured to a frame sidewall (e.g., at block 610).

In some examples, the first frame sidewall of the frame can be an inboard wall of a chain case of a chain drive assembly for a front axle assembly including the front axle and a rear axle assembly including the rear axle. Thus, in some such examples, operations at block 630 can include securing a motor to be cantilevered outboard from a gearbox or other reduction assembly such that the electric motor extends above (i.e., at a higher height than) and laterally overlaps (i.e., is vertically aligned) with the first chain case. Further, in some such examples, operations at block 620 can include securing a gearbox to be cantilevered inboard from a bearing carrier, with the bearing carrier secured to the sidewall, by extending a first main bearing of the bearing carrier to be fully within the chain case.

In some examples, the bearing carrier can be secured rearward of the rear axle assembly. In some such examples, method 600 can further include (e.g., prior to operations at block 610 or following operations at block 630) securing a first drive chain between the bearing carrier and the rear axle assembly to power the rear axle assembly and securing a second drive chain between the rear axle assembly and the front axle assembly to power the front axle assembly via the rear axle assembly. In some examples, similar operations as described above can be implemented for two opposing lateral sides of a power machine (e.g., with a motor sub-assembly of a first lateral side being fully installed before a motor sub-assembly of a second lateral side).

Certain operations of methods according to the present disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular implementations of the present disclosure. Further, in some examples, certain operations can be executed in parallel.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Unless otherwise specified or limited, the terms "about" and "approximately," as used herein with respect to a reference value, refer to variations from the reference value of ±15% or less (e.g., ±10%, ±5%, etc.), inclusive of the endpoints of the range. Similarly, the term "substantially equal" (and the like) as used herein with respect to a reference value refers to variations from the reference value of less than ±30% (e.g., ±20%, ±10%, ±5%) inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

As used herein in the context of a power machine, unless otherwise defined or limited, the term "lateral" refers to a direction that extends at least partly to a left or a right side of a front-to-back reference line defined by the power machine. Accordingly, for example, a lateral side wall of a cab of a power machine can be a left side wall or a right side wall of the cab, relative to a frame of reference of an operator who is within the cab or is otherwise oriented to operatively engage with controls of an operator station of the cab. Similarly, a "centerline" of a power machine refers to a reference line that extends in a front-to-back direction of a power machine, approximately half-way between opposing lateral sides of an outer spatial envelope of the power machine.

Also as used herein, unless otherwise defined or limited, the terms "inboard" and "outboard" refer to a relative relationship (e.g., a lateral distance) between one or more objects or structures and a centerline of the power machine, along a lateral side of the power machine. For example, a first structure that is inboard of a second structure is positioned laterally inward from the second structure so that a distance between the first structure and the centerline of the power machine is less than a distance between the second structure and the centerline of the power machine. Conversely, a first structure that is outboard of second structure is positioned laterally outward from the second structure so that a distance between the first structure and the centerline of the power machine is greater than a distance between the second structure and the centerline of the power machine.

Similarly, as used herein, unless otherwise defined or limited, the terms "interior" and "exterior" refers to a relative relationship (e.g., a lateral distance) between one or more structures (e.g., a sub-structure) and a centerline of a reference structure (e.g., a main structure) that extends in a front-to-back direction or between first and second ends of the reference structure. For example, an interior structure is disposed closer to a centerline of a reference structure than an exterior structure. In this regard, an outboard structure of a subassembly of a power machine may also be an exterior structure, but an exterior structure of a subassembly, relative to a centerline of the subassembly, may not necessarily be outboard of other components of the subassembly.

Unless otherwise defined or limited, two components that are described herein as "substantially aligned" are aligned along a particular reference direction (e.g., a front-to-back direction (such as, e.g., the front-to-back direction 499 of the frame 410 of the power machine 400 in FIG. 10A) across more than half of a dimension of at least one the components in a direction orthogonal to the reference direction.

Also as used herein, unless otherwise limited or defined, "substantially parallel" indicates a direction that is within ±12 degrees of a reference direction (e.g., within ±6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction. Similarly, as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Also as used herein, unless otherwise limited or defined, "operably supported" refers to two components that are moveably engaged together to transmit power. Similarly, "operably engaged" indicates that a first component and a second components are connected together so that the first component provides structural support to the second, relative to the first component or another structure.

Although the presently disclosed technology has been described with reference to preferred implementations, workers skilled in the art will recognize that changes may be made in form and detail without departing from the scope of the discussion.

What is claimed is:

1. A drivetrain assembly of a power machine that defines a lateral direction, the drivetrain assembly comprising:
   a first bearing carrier configured to be fixedly attached at an outboard side to a first lateral side of a frame of the power machine to operably transmit rotational power to at least one tractive element of the power machine;
   a first reduction assembly having an outboard side fixedly attached to an inboard side of the first bearing carrier; and
   a first electric motor having an inboard side fixedly attached to the outboard side of the first reduction assembly and configured to operably transmit the rotational power to the first bearing carrier via the first reduction assembly, wherein at least part of the first electric motor laterally overlaps with the first bearing carrier.

2. The drivetrain assembly of claim 1, wherein the first electric motor is supported by the first reduction assembly with a drive axis of the first electric motor above a power transmission axis of the first bearing carrier.

3. The drivetrain assembly of claim 2, wherein the drive axis is vertically aligned with the power transmission axis.

4. The drivetrain assembly of claim 2, wherein the drive axis is parallel with the power transmission axis.

5. The drivetrain assembly of claim 1, wherein the first reduction assembly is a gear box providing a speed reduction for power transmission between the first electric motor and the first bearing carrier.

6. The drivetrain assembly of claim 1, wherein the first electric motor is cantilevered from the first reduction assembly and the first reduction assembly is cantilevered from the first bearing carrier.

7. The drivetrain assembly of claim 1, further comprising a chain drive assembly that includes:
   a first drive chain extending from the first bearing carrier to a rear axle assembly to provide tractive power from the first bearing carrier to the rear axle assembly; and
   a second drive chain extending from the rear axle assembly to a front axle assembly to provide tractive power to the front axle assembly via the rear axle assembly.

8. The drivetrain assembly of claim 7, wherein a locking brake is arranged to engage the front axle assembly.

9. The drivetrain assembly of claim 7, wherein a drive axis of the first electric motor is disposed above the first and second drive chains.

10. The drivetrain assembly of claim 1, further comprising a chain drive assembly that includes a chain case for a front axle assembly and a rear axle assembly;
    wherein the first bearing carrier is mounted to an inboard side of the chain case; and
    wherein the first electric motor extends above and laterally overlaps with the chain case.

11. The drivetrain assembly of claim 1, further comprising a chain drive assembly that includes a chain case for a front axle assembly and a rear axle assembly;
    wherein the first bearing carrier includes an outboard mounting face that is secured to the chain case; and
    wherein at least one main bearing of the first bearing carrier is disposed outboard of the outboard mounting face, within the chain case.

12. The drivetrain assembly of claim 1, further comprising:
    a second bearing carrier configured to be fixedly attached at an outboard side to a second lateral side of a frame of the power machine to operably transmit rotational power to at least one tractive element on the second lateral side of the frame of the power machine;
    a second reduction assembly having an outboard side fixedly attached to an inboard side of the second bearing carrier; and
    a second electric motor having an inboard side fixedly attached to the outboard side of the second reduction assembly and configured to operably transmit the rotational power to the second bearing carrier via the second reduction assembly, wherein at least part of the second electric motor laterally overlaps with the second bearing carrier.

13. A method of assembling a power machine, the method comprising:
    securing a first motor sub-assembly on a first lateral side of the power machine, to power a front axle assembly and a rear axle assembly on the first lateral side of the power machine, including securing a first bearing carrier to a first frame sidewall on the first lateral side of the power machine;
    wherein a first gearbox is cantilevered from the first bearing carrier, relative to the first frame sidewall, to extend inboard of the first bearing carrier and the first frame sidewall; and
    wherein a first electric motor is cantilevered from the first gearbox to extend outboard of the first gearbox and above the first bearing carrier so that the first electric motor laterally overlaps with the first bearing carrier.

14. The method of claim 13, wherein the first frame sidewall is an inboard wall of a first chain case of a chain drive assembly for the front and rear axle assemblies; and
wherein the first electric motor extends above and laterally overlaps with the first chain case.

15. The method of claim 13, wherein the first frame sidewall is an inboard wall of a first chain case of a chain drive assembly for the front and rear axle assemblies; and
wherein securing the first bearing carrier to the first frame sidewall includes extending a first main bearing of the first bearing carrier to be fully within the first chain case.

16. The method of claim 13, wherein the first bearing carrier is secured rearward of the rear axle assembly; and
wherein the method further comprises:
securing a first drive chain between the first bearing carrier and the rear axle assembly to power the rear axle assembly; and
securing a second drive chain between the rear axle assembly and the front axle assembly to power the front axle assembly via the rear axle assembly.

* * * * *